United States Patent
Camozzi et al.

(10) Patent No.: US 12,486,880 B2
(45) Date of Patent: Dec. 2, 2025

(54) METHOD AND SYSTEM FOR DETECTING AND MEASURING A BRAKING FORCE OF A BRAKING SYSTEM FOR VEHICLE, BY MEANS OF PHOTONIC SENSORS INCORPORATED IN A BRAKE CALIPER

(71) Applicant: BREMBO S.p.A., Curno (IT)

(72) Inventors: Francesco Camozzi, Curno (IT); Fabio Meldini, Curno (IT); Paolo Polvara, Curno (IT); Daniele Casari, Curno (IT); Tiziano Nannipieri, Curno (IT); Salvatore Bonomo, Curno (IT)

(73) Assignee: Brembo S.p.A., Bergamo (IT)

( * ) Notice: Subject to any disclaimer, the term of this patent is extended or adjusted under 35 U.S.C. 154(b) by 648 days.

(21) Appl. No.: 17/618,643

(22) PCT Filed: Jun. 12, 2020

(86) PCT No.: PCT/IB2020/055520
§ 371 (c)(1),
(2) Date: Dec. 13, 2021

(87) PCT Pub. No.: WO2020/250187
PCT Pub. Date: Dec. 17, 2020

(65) Prior Publication Data
US 2022/0252121 A1    Aug. 11, 2022

(30) Foreign Application Priority Data
Jun. 13, 2019 (IT) .................. 102019000008883

(51) Int. Cl.
*F16D 66/00* (2006.01)
*B60T 17/22* (2006.01)
(Continued)

(52) U.S. Cl.
CPC .............. *F16D 66/00* (2013.01); *B60T 17/22* (2013.01); *F16D 65/0068* (2013.01);
(Continued)

(58) Field of Classification Search
CPC ................. F16D 66/00; F16D 65/0068; F16D 2066/005; F16D 2066/001;
(Continued)

(56) References Cited

U.S. PATENT DOCUMENTS 7,726,942 B2    6/2010    Mortensen et al.
7,813,598 B2    10/2010   Mortensen et al.
(Continued)

FOREIGN PATENT DOCUMENTS

EP    2772377 A1    9/2014
WO    2005/071382 A1    8/2005

OTHER PUBLICATIONS

British Patent No. GB 2372825 to Pitcher et al published on Sep. 4, 2002.*
(Continued)

*Primary Examiner* — Pamela Rodriguez
(74) *Attorney, Agent, or Firm* — Marshall & Melhorn, LLC

(57) ABSTRACT

A method for detecting and measuring a braking force and/or a braking torque deriving from actuation of a vehicle braking system includes incorporating a fiber-optic strain sensor of fiber Bragg grating type in a respective position in a portion of material of the body of the brake caliper susceptible to deformation, detecting, by the fiber-optic strain sensor local deformation and/or strain acting in the respective position, generating a respective first photonic signal representative of the detected deformation and/or strain, receiving the first photonic signal, by an optical reading/interrogation unit optically connected to the fiber-
(Continued)

optic strain sensor, generating, by the optical reading/interrogation unit, a first electrical signal representative of the local detected deformation and/or strain, based on the received first photonic signal, and processing the first electrical signal to obtain a measurement of the braking force and/or braking torque. A sensorized brake caliper and a corresponding system to detect and measure a braking force and/or braking torque are also described.

18 Claims, 12 Drawing Sheets

(51) Int. Cl.
*F16D 55/00* (2006.01)
*F16D 65/00* (2006.01)
*G01L 1/24* (2006.01)
*G01L 1/26* (2006.01)
*G01L 5/00* (2006.01)
*G01L 5/28* (2006.01)

(52) U.S. Cl.
CPC ............... *G01L 1/246* (2013.01); *G01L 1/26* (2013.01); *G01L 5/0028* (2013.01); *G01L 5/28* (2013.01); *F16D 2055/0016* (2013.01); *F16D 2066/001* (2013.01); *F16D 2066/005* (2013.01); *F16D 2066/006* (2013.01); *F16D 2250/0076* (2013.01)

(58) Field of Classification Search
CPC ....... F16D 2066/006; F16D 2250/0076; F16D 2055/0016; B60T 17/22; G01L 1/26; G01L 1/246; G01L 5/28; G01L 5/0028; G01L 5/22; G01B 11/165
See application file for complete search history.

(56) References Cited

U.S. PATENT DOCUMENTS

| | | | |
|---|---|---|---|
| 9,126,476 B2 | 9/2015 | Takahashi | |
| 10,119,873 B2* | 11/2018 | Finch, Jr | ............ G01L 5/28 |
| 2022/0242383 A1* | 8/2022 | Camozzi | ............ G01L 5/0042 |
| 2022/0291024 A1* | 9/2022 | Camozzi | ............ G01D 5/35316 |

OTHER PUBLICATIONS

German Patent No. DE 102004059081 to Zacharias et al published on Jun. 8, 2006.*
European Patent No. EP 2317295 to Ruggiero et al published on May 4, 2011.*
B.T. Major, D. Tiwari, R. Correia, S.W. James, M. Tirovic and R.P. Tatam; "Fibre Bragg grating sensors for the analysis of pressure distribution at a disc brake/pad interface"; Proceedings of SPIE, 25th International Conference on Optical Fiber Sensors, Apr. 24-28, 2017; pp. 1032320-1 to 1032320-4; vol. 10323, Proceedings of SPIE ISSN 0277-786X; Jeju, Republic of Korea; XP060083661.
European Patent Office, International Search Report with Written Opinion, issued in PCT/IB2020/055520, Sep. 15, 2020, 18 pages, European Patent Office, Rijswijk, Netherlands.

* cited by examiner

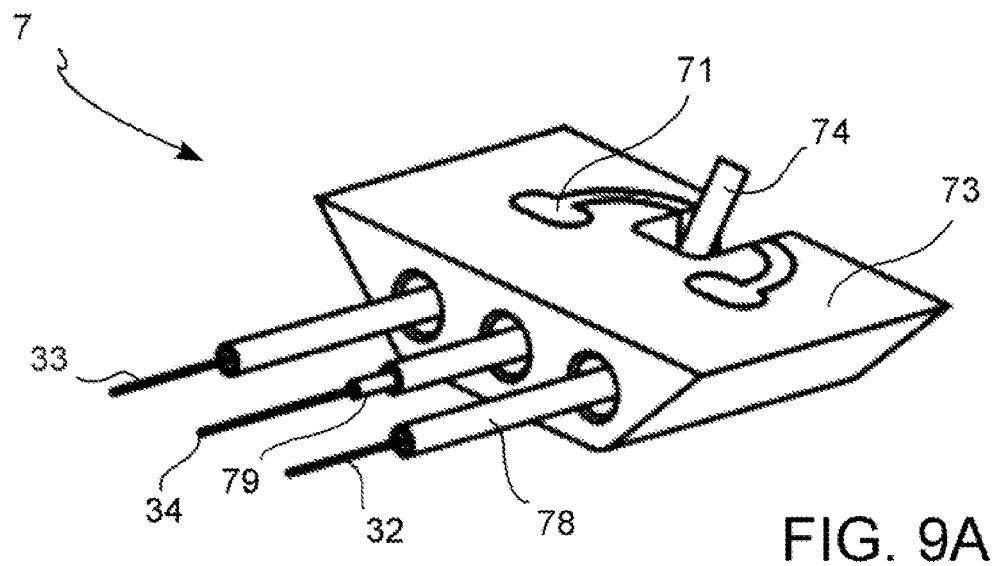
FIG. 9A
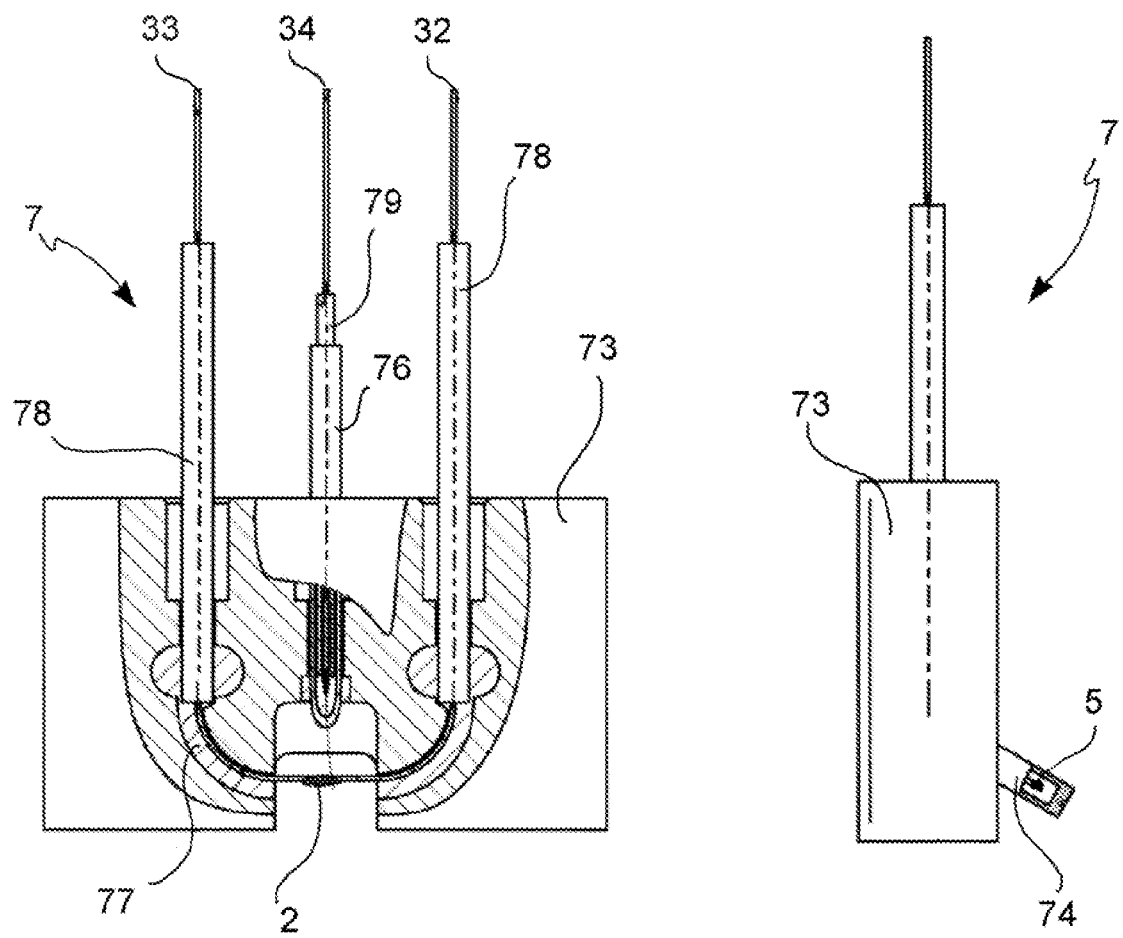
FIG. 9B
FIG. 9C

METHOD AND SYSTEM FOR DETECTING AND MEASURING A BRAKING FORCE OF A BRAKING SYSTEM FOR VEHICLE, BY MEANS OF PHOTONIC SENSORS INCORPORATED IN A BRAKE CALIPER

CROSS-REFERENCE TO RELATED APPLICATIONS

This application is a National Phase Application of PCT International Application No. PCT/IB2020/055520, having an International Filing Date of Jun. 12, 2020, which claims priority to Italian Application No. 102019000008883 filed Jun. 13, 2019, each of which is hereby incorporated by reference in its entirety.

FIELD OF THE INVENTION

The present invention relates to a method and system for detecting and measuring a braking force of a vehicle braking system by means of photonic sensors (i.e., fiber-optic sensors) incorporated in a brake caliper.

The present invention further relates to a sensorized brake caliper equipped to allow the aforesaid method to be implemented.

PRIOR ART

For controlling, monitoring, and actuating a braking system, for example an electronically controlled disc brake system, it is very useful to know the braking force or torque value applied by the brake calipers of the braking system during a braking action in real-time and as accurately as possible.

However, it is difficult to measure the braking force and/or torque applied by the brake calipers of the brake system directly, accurately, and reliably.

For this purpose, it would be desirable to be able to incorporate force sensors capable of detecting and providing such information in the brake caliper itself.

However, the force sensors made available by the prior art are not suited to be incorporated in the body of the brake caliper either because they are not sufficiently miniaturized and compact, or because they cannot be easily connected to the outside for activation and/or reading, or because they are too sensitive to temperature variations and thus unsuitable to operate in an environment, such as a brake caliper, which is subjected to considerable temperature and climatic fluctuations.

At least some of the aforesaid drawbacks apply, for example, to the known force sensors based on piezo-electric or piezo-resistive phenomena.

Given this, it is possible to try to estimate and/or calculate the value of the braking force and/or torque indirectly on the basis of the detection of other quantities, or on the basis of force detections made externally with respect to the brake caliper itself. However, this causes the further drawback deriving from the fact that such an estimate or calculation does not fully meet the required accuracy requirements.

Although the technical field of sensors offers a wide range of solutions, as far as the Applicant is aware, there are currently no solutions of sensors which can be incorporated in a brake caliper, and which are such to detect the braking force and/or torque applied in real-time by a brake caliper during the braking action, either directly or indirectly, but with high precision and reliability.

Indeed, the known solutions offer sensors which either cannot be incorporated in a brake caliper, from a practical point of view (because they are either not sufficiently compact or too complex) or offer indirect measurements from which it is not possible to obtain the braking force and/or torque value with sufficient accuracy.

The need thus arises for force sensors or sensors of other quantities related to the braking force and/or torque, which are compact, miniaturized and simple to activate/read, such to be practically incorporated into the body of a brake caliper, without affecting its performance at all, and which at the same time allow determining the braking force and/or torque applied by the brake caliper with high accuracy and reliability.

As noted above, such requirements are not fully met by the solutions currently available from the prior art.

SOLUTION

It is an object of the present invention to provide a method for detecting and measuring a braking force and/or braking torque resulting from the actuation of a vehicle friction brake system, by means of detection carried out at least in a brake caliper of the brake system, which allows overcoming at least partially the aforesaid disadvantages described with reference to the prior art and meeting the aforesaid requirements which are particularly felt in the concerned technical field.

This and other objects are achieved by a method for detecting and measuring a braking force and/or torque as described and claimed herein.

It is a further object of the present invention to provide a method for detecting and measuring a braking force and/or torque deriving from the actuation of a friction brake by means of detection carried out in at least one suspension part of a vehicle to which a brake caliper is connected.

This object is achieved by the method for detecting and measuring a braking force and/or torque deriving from the actuation of a friction brake described and claimed herein.

It is a further object of the present invention to provide a sensorized brake caliper for a vehicle braking system, equipped so as to allow performing the aforesaid method for detecting and measuring a braking force and/or braking torque.

These and other objects are achieved by a sensorized brake caliper as described and claimed herein.

It is a further object of the present invention to provide a system for detecting and measuring a braking force and/or braking torque, using at least one sensorized caliper.

This and other objects are achieved by the system for detecting and measuring a braking force and/or braking torque described and claimed herein.

It is a further object of the present invention to provide a braking system using at least one of the aforesaid sensorized brake calipers or the aforesaid system for detecting and measuring a braking force and/or braking torque.

These and other objects are achieved by the braking system described and claimed herein.

BRIEF DESCRIPTION OF THE DRAWINGS

Further features and advantages of the method and systems according to the invention will be apparent from the following description of its preferred embodiments, given by way of non-limiting examples, with reference to the accompanying figures, in which:

FIGS. 9A, 9B, 9C, 10A, 10B and 11 show some details of a system for detecting and measuring a braking force and/or braking torque, according to an embodiment of the invention, and refer in particular to the options of embodiment of sensors comprised in such system;

DETAILED DESCRIPTION OF THE INVENTION

Figure 1:
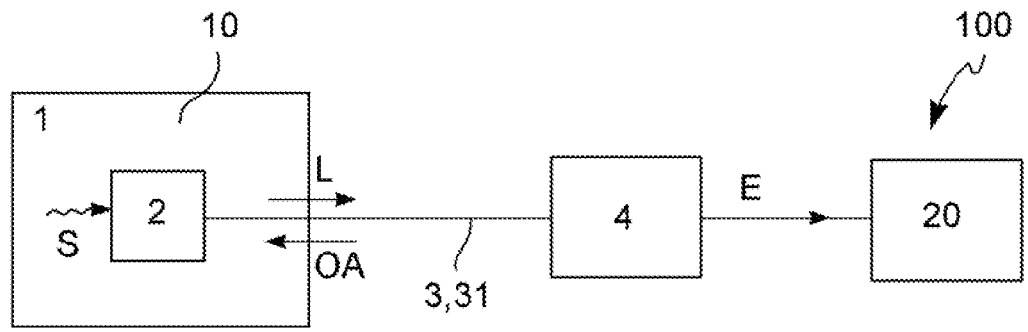
FIGS. 1-3, 4A, 4B, 4C, 5A, 5B and 6 illustrate, by means of function block charts, the respective different embodiments of sensorized brake caliper and a system for detecting and measuring a braking force and/or braking torque, according to the present invention.
Figure 2:
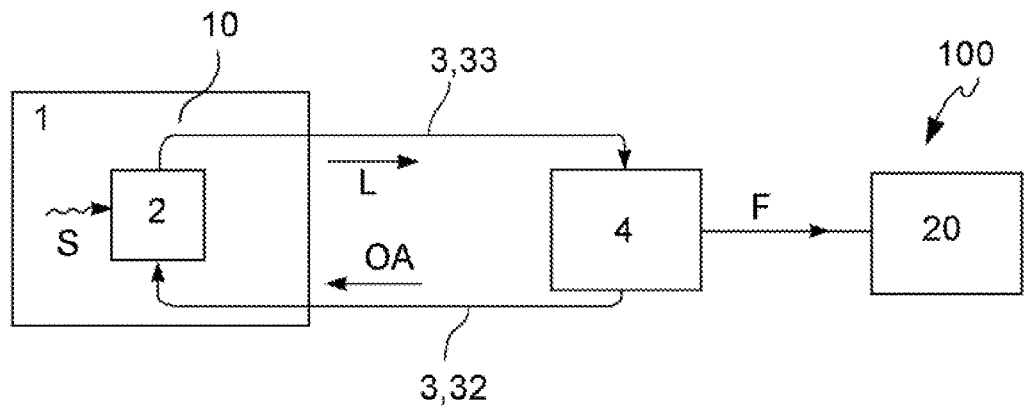

With reference to FIGS. 1-3, 4A, 4B, 4C, 5A, 5B and 6 and 12-16, a method is now described for detecting and measuring a braking force and/or braking torque BF/BT deriving from the actuation of a vehicle friction braking system 1000, by means of detection performed in at least one brake caliper 10 of the braking system.

The method comprises the steps of incorporating in the body of the aforesaid at least one brake caliper at least one deformation and/or strain sensor 2, at a respective predefined and fixed position, in a portion of material M of the body of the aforesaid at least one brake caliper 10, susceptible to deformation due to a reaction force which is applied onto the brake caliper at the braking force and/or torque BF/BT, so that the deformation and/or strain S acting locally in the aforesaid position, in which the at least one deformation and/or strain sensor 2 is located, is representative of the braking force and/or braking torque BF/BT.

The aforesaid at least one deformation and/or strain sensor 2 IS a fiber-optic strain sensor 2 of the fiber Bragg grating type.

The method then comprises the steps of detecting the local deformation and/or strain S acting in the respective position by means of each of the aforesaid at least one fiber-optic strain sensor 2, and generating a respective at least one first photonic signal L representative of the detected deformation and/or strain S.

Then, the method includes receiving the aforesaid at least one first photonic signal L, by an optical reading/interrogation unit 4, optically connected to the aforesaid at least one fiber-optic strain sensor 2, and to generate, by the optical reading/interrogation unit 4, at least one first electrical signal E representative of the detected local deformation and/or strain S, on the basis of the aforesaid at least one first photonic signal L received.

The method finally comprises the step of processing the aforesaid at least one first electrical signal E representative of the deformation and/or strain S to obtain a measurement of the braking force and/or braking torque BF/BT.

According to a preferred embodiment, the method comprises the further steps of incorporating at least one temperature sensor 5 (again, a temperature sensor 5 is a fiber Bragg Grating type optical fiber temperature sensor 5), in the aforesaid portion of material M of the body of the brake caliper 10, and of detecting, by means of each of at least one temperature sensor 5, a temperature T value present in the respective position, and generating a respective at least one second photonic signal Lt representative of the value of the detected temperature T.

The method further provides receiving said at least one second generated photonic signal Lt, by the optical reading/interrogation unit 4, optically connected to the aforesaid at least one temperature sensor 5; and of generating, by the optical reading/querying unit 4, at least one second electrical signal Et representative of the temperature, on the basis of the at least one second photonic signal Lt received.

In this case, the step of processing comprises processing the aforesaid at least one first electrical signal E and at least one second electrical signal Et to obtain a measurement of the braking force and/or braking torque BF/BT taking a temperature compensation into account.

It is worth noting that the aforesaid term "incorporating" into the portion of material M (of the body of the brake caliper) can also be understood as "Inserting" or "integrating" or "encapsulating". i.e., arranging the sensors so that they are biased by the deformation or strain acting the aforesaid portion of material M of the brake caliper body.

The aforesaid fiber Bragg grating optical sensors (hereinafter also named "FBG sensors") are deformation and/or strain sensors of the type known in itself.

It is known that an FBG sensor is a very sensitive and versatile optical device for measuring various physical parameters, including strain and temperature. In its simplest form, an FBG sensor is obtained by means of a spatially periodic modulation of the refractive index inscribed in the core of the optical fiber (which can be obtained, for example, through the phenomenon of photo-sensitivity or using femtosecond light pulses).

The FBG sensors exploit the presence of a resonant condition which reflects the incident light at the so-called "Bragg wavelength" $\lambda_B$, defined as $\lambda_B=2n_{eff}\lambda$, where $n_{eff}$ is the effective refractive index of the fundamental mode of the optical fiber and $\lambda$ is the spatial pitch (periodicity) of the grating.

The operating principle of the FBG sensors is based on the property that any change either to the effective refractive index or to the grating pitch, caused by external effects, such as strain or temperatures, results in a respective shift $\Delta\lambda_B$ of the operating wavelength (Bragg wavelength) which can be derived from formula [1]:

$$\frac{\Delta\lambda_B}{\lambda_B} = k\varepsilon + \alpha_T \Delta T$$

where $\Delta\lambda_B=\lambda-\lambda_B$ is the Bragg wavelength variation with respect to the reference Bragg wavelength $\lambda_B$, k is a scale factor and $\alpha\tau$ is the thermo-optical coefficient; the Bragg wavelength shift is linearly dependent on the longitudinal strain $\varepsilon$ with a sensitivity value equal to about 1.2 pm/$\mu\varepsilon$ and temperature change with a sensitivity value of about 11 pm/°C. for silicon fibers in the range of 1560 nm.

As indicated above, it is appropriate to compensate the strain results obtained by the FBG sensors with respect to temperature changes under the operating conditions of the FBG sensor 2 incorporated in the material M. Such compensation can be made by developing the aforesaid equation [1] as:

$$\frac{\lambda - \lambda_B}{\lambda_B} = k(\varepsilon_M + \varepsilon_T) + \alpha_T \Delta T = k(\varepsilon_M + \alpha_{SP}\Delta T) + \alpha_T \Delta T$$

where $\varepsilon = \varepsilon_M + \varepsilon_T$ includes two contributions, one due to pure mechanical strain, and a further contribution induced by thermal expansion $\varepsilon_T$ ($\alpha_{SP}$ is the thermal expansion coefficient of the material). Indicating with $\lambda_B$ and $T_0$ the reference Bragg wavelength and reference temperature, and with $\lambda$ and $T$ the real-time values of the wavelength and temperature can be written:

$$\frac{\Delta \lambda_B}{\lambda_B} = k(\varepsilon_M + \varepsilon_T) + \alpha_T(T - T_0) = k[\varepsilon_M + \alpha_{SP}(T - T_0)] + \alpha_T(T - T_0)$$

from which the pure mechanical effort $\varepsilon_M$ can be obtained as:

$$\varepsilon_M = \frac{1}{K}\left(\frac{\lambda - \lambda_B}{\lambda_B}\right) - \alpha_{SP}(T - T_0) - \frac{\alpha_T}{K}(T - T_0).$$

The real-time temperature value (to be entered in the formula above to obtain the compensated value of $\varepsilon_M$) is obtained through the additional FBG sensor (i.e., temperature sensor 5), which may be enclosed in a loose tube placed near the FBG strain sensor 2.

According to an implementation option, the aforesaid at least one temperature sensor 5 is made by means of a fiber Bragg grating made in a different optical fiber with respect to the fiber or the fibers with which at least one deformation and/or strain sensor 2 is made. Furthermore, the fiber Bragg grating of at least one temperature sensor 5 is arranged to be insensitive to thermal and mechanical deformations of the caliper body material.

The FBG sensors are "passive" sensors, meaning that they do not need to be powered, but are activated by illumination, i.e., by sending an optical activation radiation, at an appropriate wavelength (e.g., the Bragg wavelength), in the fiber optic section in which the grating in the sensor is contained. In response to this, the FBG sensor either reflects or transmits an optical (i.e., photonic) signal, which depends not only on the incident radiation but also on the strain conditions to which the grating itself is subjected. Such photonic signal can be, in different method implementation options which will be illustrated below, a transmitted optical signal (i.e., optical spectrum) or a reflected optical signal (i.e., optical spectrum).

According to an embodiment of the method (diagrammatically shown in FIG. 1), the fiber-optic strain sensor 2 is connected to the optical reading/interrogation unit 4 by means of a first connection optical fiber 31. Furthermore, the optical reading/interrogation unit 4 is configured to activate the aforesaid fiber-optic strain sensor 2 by transmitting an optical activation radiation OA through the aforesaid first connection optical fiber 31. Furthermore, the aforesaid first photonic signal L comprises a first optical spectrum L reflected by the strain sensor 2 of the fiber Bragg grating type, which reaches the optical reading/interrogation unit 4 through said first connection optical fiber 31.

According to an implementation option (shown in FIG. 4B), the at least one temperature sensor 5 is made by means of a fiber Bragg grating made in the same optical fiber in which the at least one deformation and/or strain sensor 2 is made and is arranged to be insensitive to thermal and mechanical deformations of the material of the caliper body. Furthermore, the fiber-optic temperature sensor 5 is connected to the optical reading/interrogation unit 4 by means of said first connection optical fiber 31.

In this case, the optical reading/interrogation unit 4 is configured to activate the fiber-optic temperature sensor 5 by transmitting an optical activation radiation OAt through the first connection optical fiber 31 (wavelength-multiplexed with the optical activation radiation OA of the strain sensor), and the second photonic signal Lt comprises a second optical spectrum Lt reflected by the temperature sensor 5 (wavelength-multiplexed with the first optical spectrum L reflected by the strain sensor 2), which reaches the optical reading/interrogation unit 4 through the first connection optical fiber 31.

According to another embodiment of the method (diagrammatically shown in FIG. 2), the fiber-optic strain sensor 2 is connected to the optical reading/interrogation unit 4 by means of a first input connection optical fiber 32 and a second output connection optical fiber 33. Furthermore, the optical reading/interrogation unit 4 is configured to activate the aforesaid fiber-optic strain sensor 2 by transmitting an optical activation radiation OA through the first input connection optical fiber 32. Furthermore, the aforesaid first photonic signal L comprises a first optical spectrum L transmitted by the fiber Bragg grating type strain sensor 2, which reaches the optical reading/interrogation unit 4 through the second connection optical fiber 33.

According to an implementation option (shown in FIG. 4A), the at least one temperature sensor 5 is made by means of a fiber Bragg grating made in the same optical fiber in which the at least one deformation and/or strain sensor 2 is made and is arranged to be insensitive to thermal and mechanical deformations of the material of the caliper body. Furthermore, the fiber-optic temperature sensor 5 is connected to the optical reading/interrogation unit 4 by means of the aforesaid first input connection optical fiber 32 and second output connection optical fiber 33.

In this case, the optical reading/interrogation unit 4 is configured to activate the fiber-optic temperature sensor 5 transmitting an optical activation radiation OAt through the first input connection optical fiber 32 (wavelength-multiplexed with the optical activation radiation OA of the strain sensor) and the second photonic signal Lt comprises a second optical spectrum Lt transmitted by the temperature sensor 5 (wavelength-multiplexed with the first optical spectrum L transmitted by the strain sensor 2), which reaches the optical reading/interrogation unit 4 through said second output connection optical fiber 33.

Figure 3:
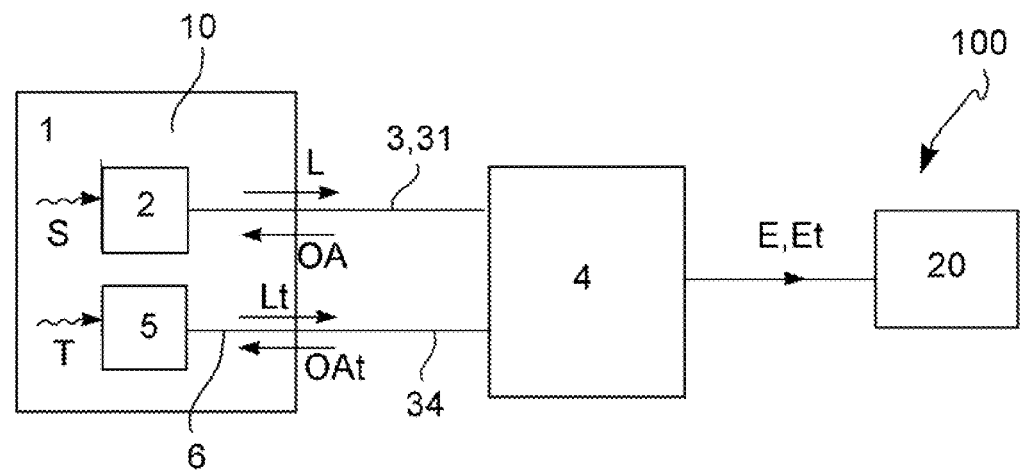
Figure 4A:
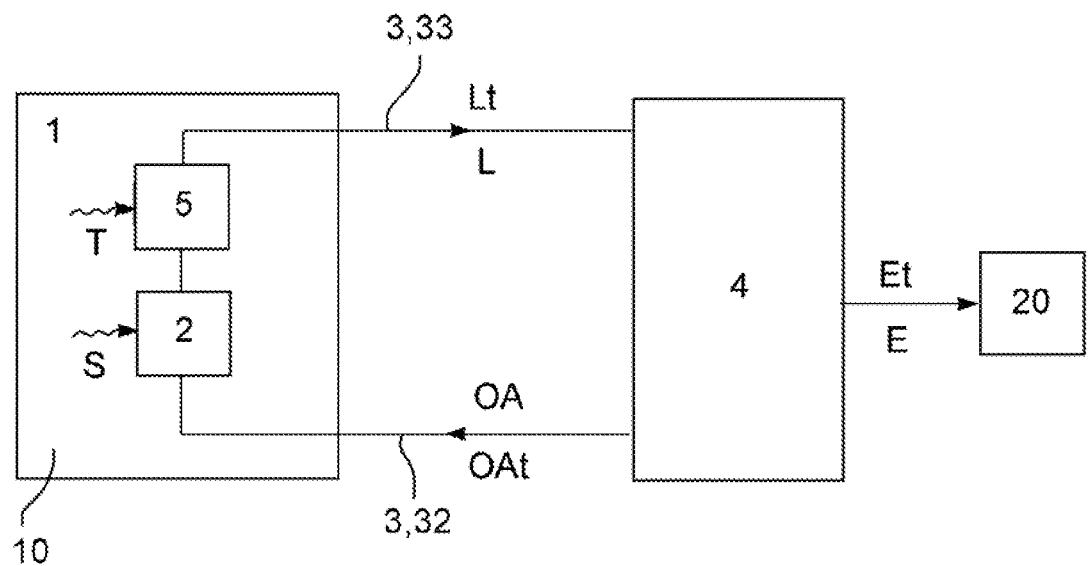
Figure 4B:
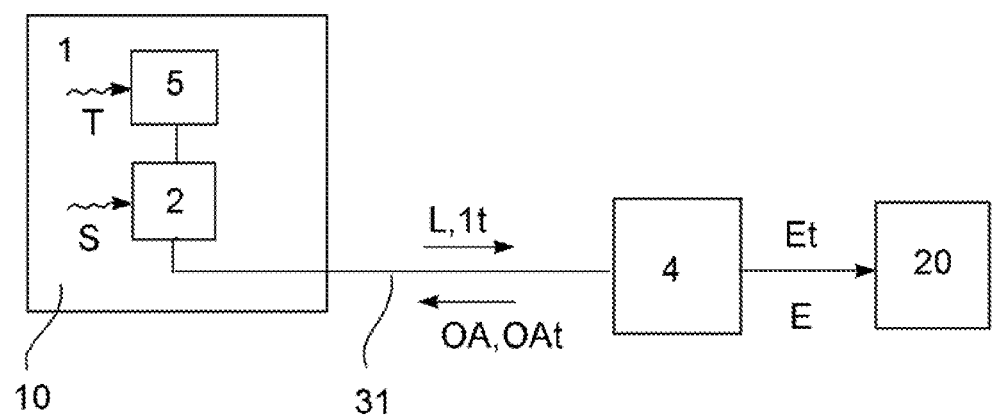
Figure 4C:
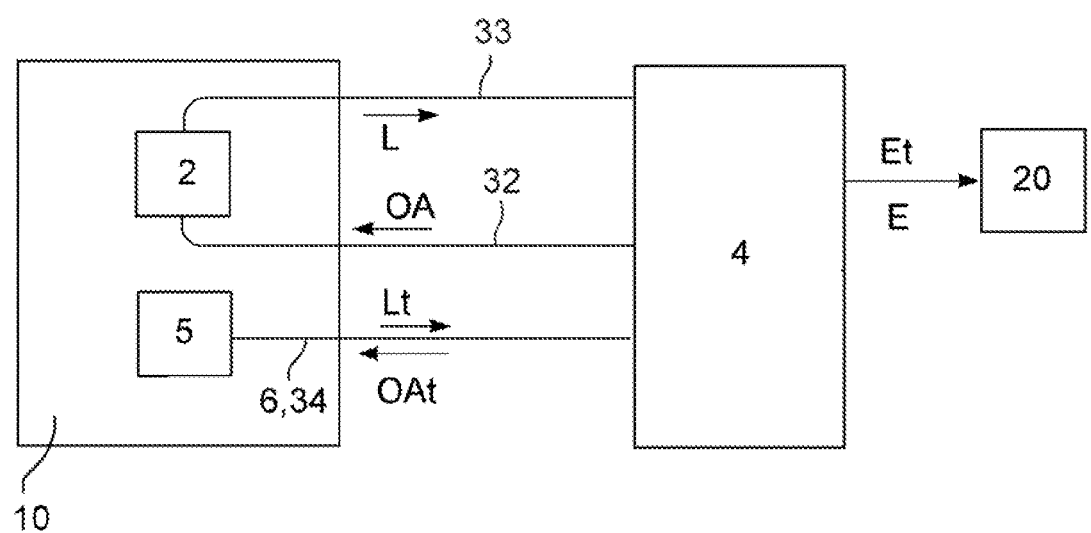
Figure 5A:
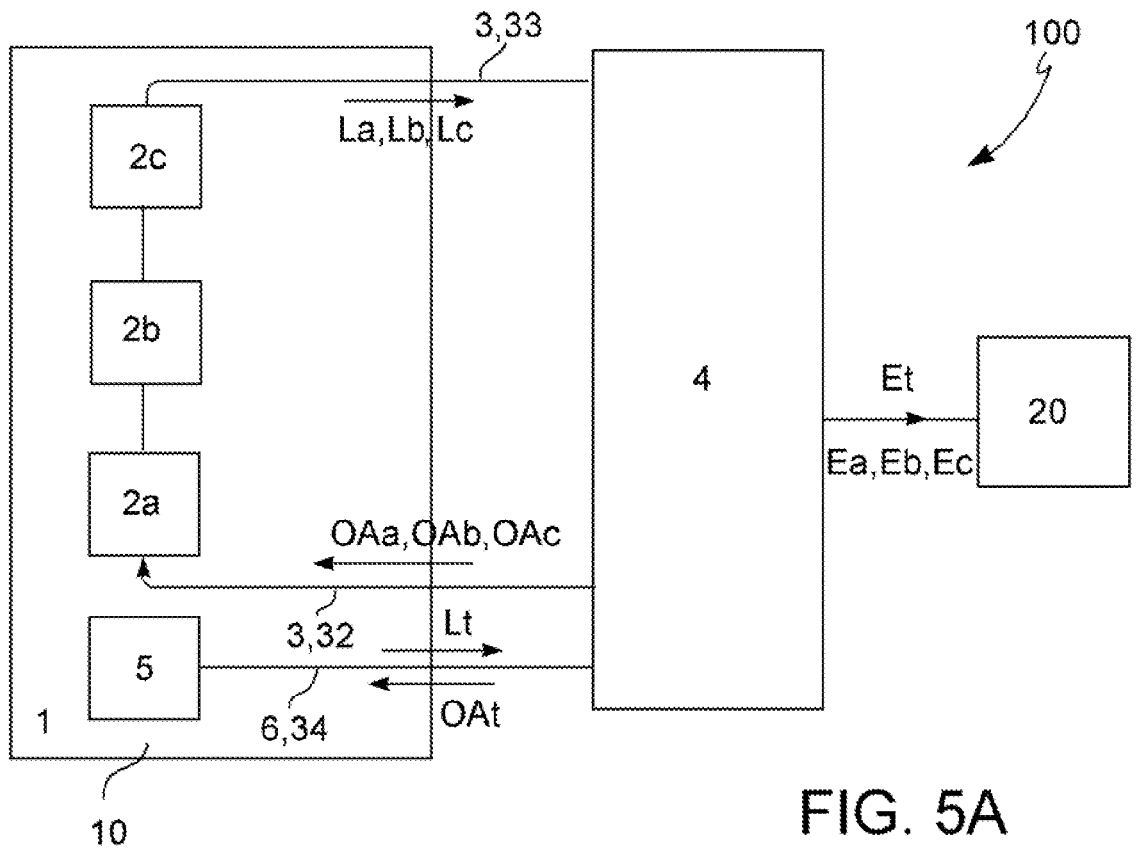
Figure 5B:
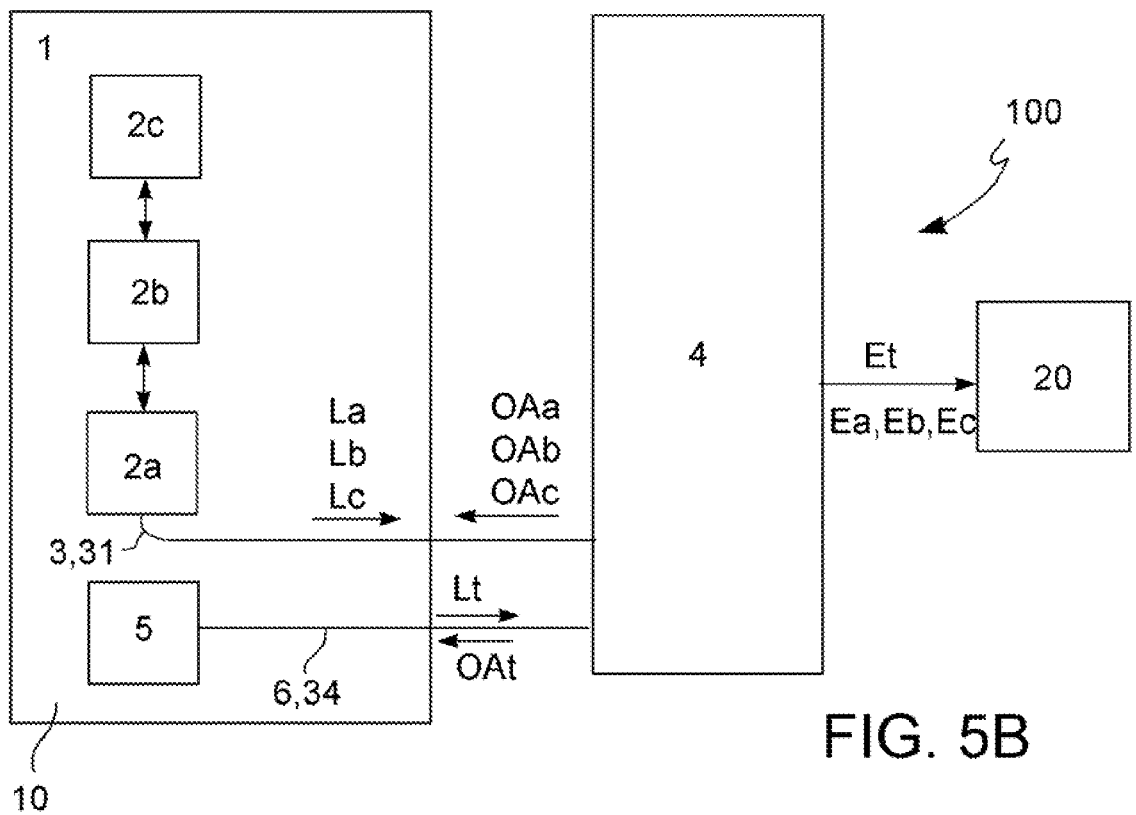
Figure 6:
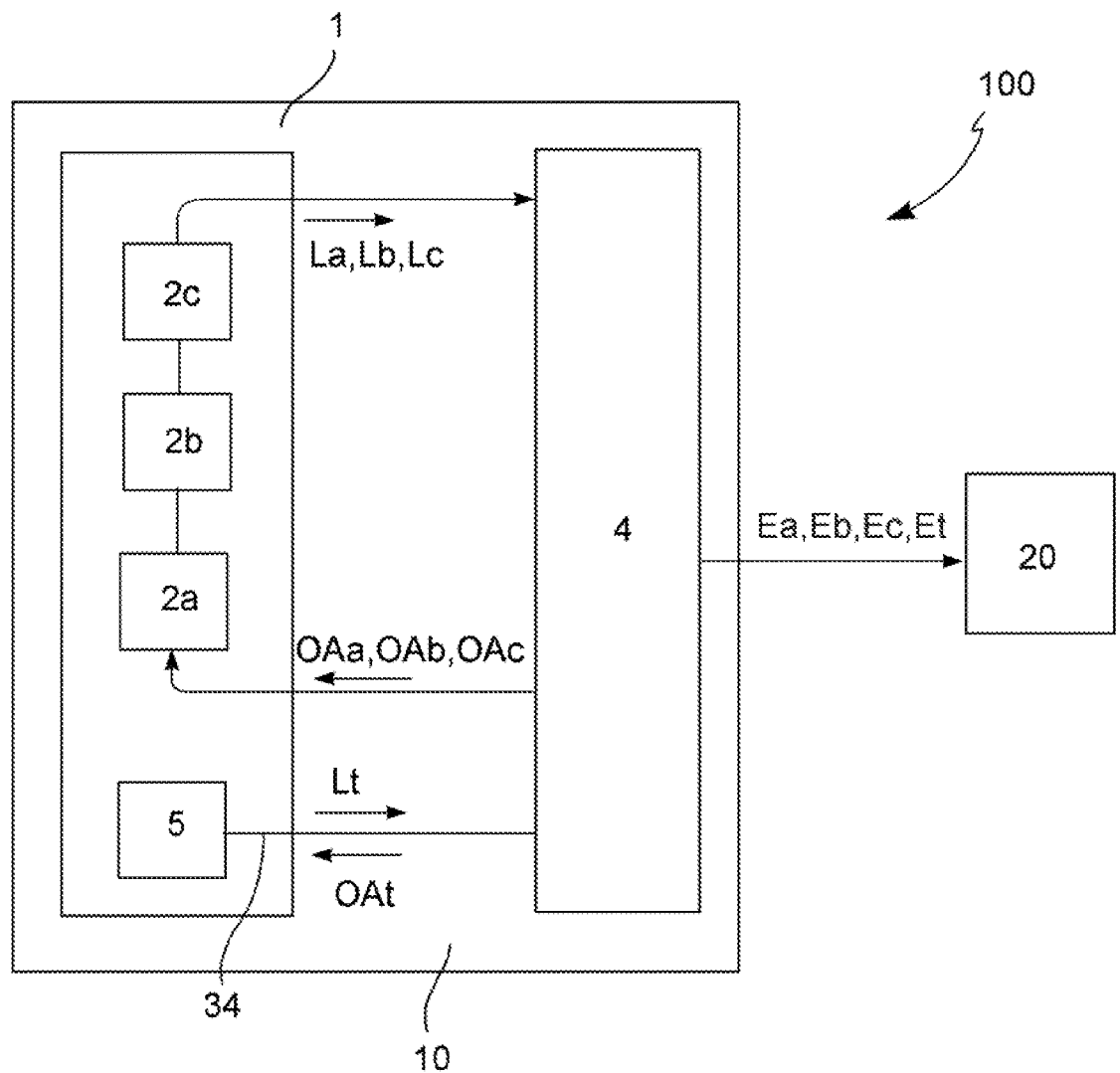

According to an embodiment of the method (diagrammatically illustrated in the implementation options in FIGS. 3 and 4C), the fiber-optic temperature sensor 5 is connected to the optical reading/interrogation unit 4 by means of a third connection optical fiber 34. Furthermore, the optical reading/interrogation unit 4 is configured to activate the fiber-optic temperature sensor 5 by transmitting an optical activation radiation Q through said third connection optical fiber 34. Furthermore, the aforesaid second photonic signal Lt comprises a second optical spectrum Lt reflected by the temperature sensor 5 of fiber Bragg grating type, which reaches the optical reading/interrogation unit 4 through the third connection optical fiber 34.

According to an implementation option, each connection between each fiber in which the fiber Bragg grating type sensors are obtained and a respective connection optical fiber to the optical reading/interrogation unit is made by means of a fiber spice or a detachable photonic connection element (optical connector).

According to an embodiment of the method, a plurality of fiber-optic strain sensors 2 is provided and advantageously used.

In this embodiment (diagrammatically shown in FIGS. 5A and 5B), the step of incorporating comprises incorporating a plurality of deformation and/or strain sensors 2a, 2b, 2c, each made by means of a respective Bragg grating, associated with a respective central operating wavelength $\lambda a$, $\lambda b$, $\lambda c$. The aforesaid Bragg gratings are made of one or more fiber-optic elements, wherein each one or more fiber-optic elements is incorporated in the aforesaid portion of material M of the body of the brake caliper, in a respective position and with a respective predefined and fixed spatial development.

Furthermore, the step of generating a respective at least one photonic signal comprises generating a plurality of respective first photonic signals La, Lb, Lc. The step of receiving comprises receiving the aforesaid plurality of first photonic signals La, Lb, Lc, from the optical reading/interrogation unit 4.

The step of generating, by the optical reading/interrogation unit 4, at least one first electrical signal E comprises generating a respective plurality of first electrical signals Ea, Eb, Ec, on the basis of the plurality of first photonic signals La, Lb, Lc received.

The step of processing comprises processing the number of first electrical signals Ea, Eb, Ec to obtain a measurement of the braking force and/or braking torque BF/BT.

According to an implementation option, each of said one or more fiber-optic elements comprises a plurality of deformation and/or strain sensors 2a, 2b, 2c, obtained in different stretches of the fiber-optic element and associated with different respective operating wavelengths $\lambda a$, $\lambda b$, $\lambda c$.

In this case, the method comprises the further steps of transmitting, by the optical reading/interrogation element 4, through the connection optical fiber, respective optical activation radiations OAa, OAb, OAc to the plurality of sensor and/or strain elements, at different respective operating wavelengths $\lambda a$, $\lambda b$, $\lambda c$, by means of wavelength-division multiplexing (WDM) transmission techniques; then, of receiving, through the connection optical fiber 33, and distinguishing the respective optical spectra reflected by each of the plurality of deformation and/or strain sensors 2a, 2b, 2c, by means of de-multiplexing with wavelength-division multiplexing WDM techniques, wherein each of the aforesaid reflected optical spectra corresponds to a respective fast photonic signal La, Lb, Lc.

According to an implementation option of the method, the material M of which the portion of the material of the brake caliper 10 is made, in which at least one deformation and/or strain sensor 2 is incorporated, is aluminum or cast iron or titanium or magnesium or aluminum alloys or CFRP composite materials.

The brake caliper on which the method is applicable can be fixed or floating, monobloc or assembled.

According to an embodiment of the method, the step of incorporating firstly comprises incorporating the at least one deformation and/or strain sensor 2 within a pre-formed frame and/or package 7, having predefined geometry and dimensions (as shown, for example, in FIGS. 9A, 9B, 10A, 10B). Furthermore, the step of incorporating comprises incorporating in the body of the brake caliper 10 the aforesaid pre-formed frame or package 7 (as shown, for example, in FIGS. 7 and 8), during the manufacturing of the brake caliper 10, in a fixed and predefined position, in the mold and/or molding casing of the brake caliper, so that each of the aforesaid at least one deformation and/or strain sensor 2 is partially or completely incorporated in the desired portion of material M of the body of the brake caliper.

Hereinafter, some further details are given for the above mentioned preformed frame 7 with reference to FIGS. 9A, 9B, 9C, 10A and 10B.

FIGS. 9A 9B, 9C illustrate an implementation option (corresponding to the functional illustration shown in FIG. 4C) that provides a through optical fiber with input and output, containing the strain sensor 2, and another fiber dedicated to temperature sensor 5.

According to this implementation option, the pre-formed frame 7 comprises an aluminum housing 73, configured to contain one or more stretches of optical fiber comprising the one or more fiber-optic strain sensors 2. A recess 71 is obtained in the housing 73 for fixing the optical fiber "in sight" by means of a suitable adhesive or binder.

In this implementation option, the pre-formed frame 7 further comprises two capillary tubes 78 (for example, made of stainless steel) adapted to contain and protect the connection optical fiber 32, 33, coming out of the pre-formed frame, and a further output capillary tube 79 adapted to contain the connection optical fiber 34 dedicated to the temperature sensor 5.

The optical fiber containing the strain sensor is pre-assembled and is fixed by means of binder or adhesive 77 (e.g., cementitious adhesive) in the aluminum housing 73 (as shown in the section view in FIG. 9B). The strain sensor 2 (shown in FIG. 9B) is exposed in the fusion process and thus embedded in the aluminum forming the caliper body.

Figure 10A:
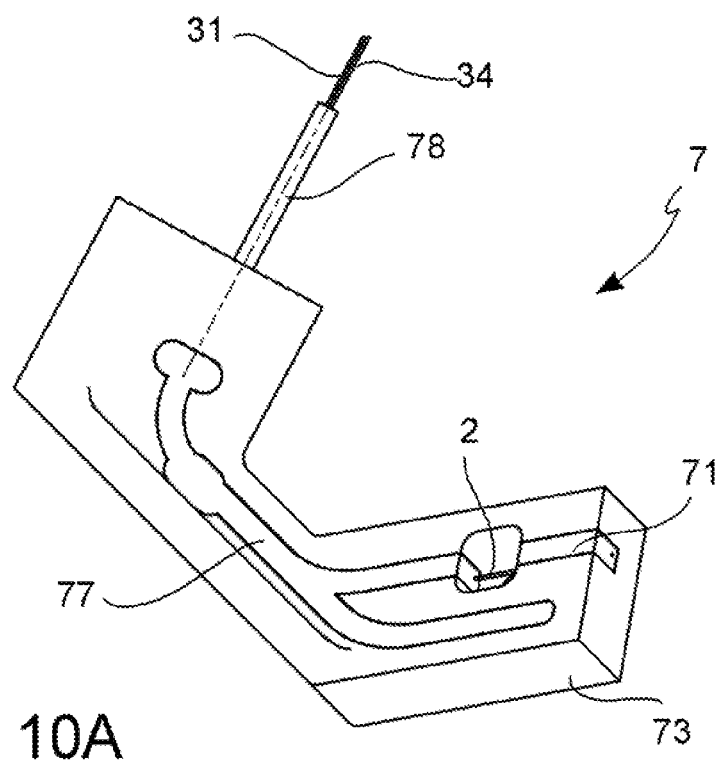
Figure 10B:
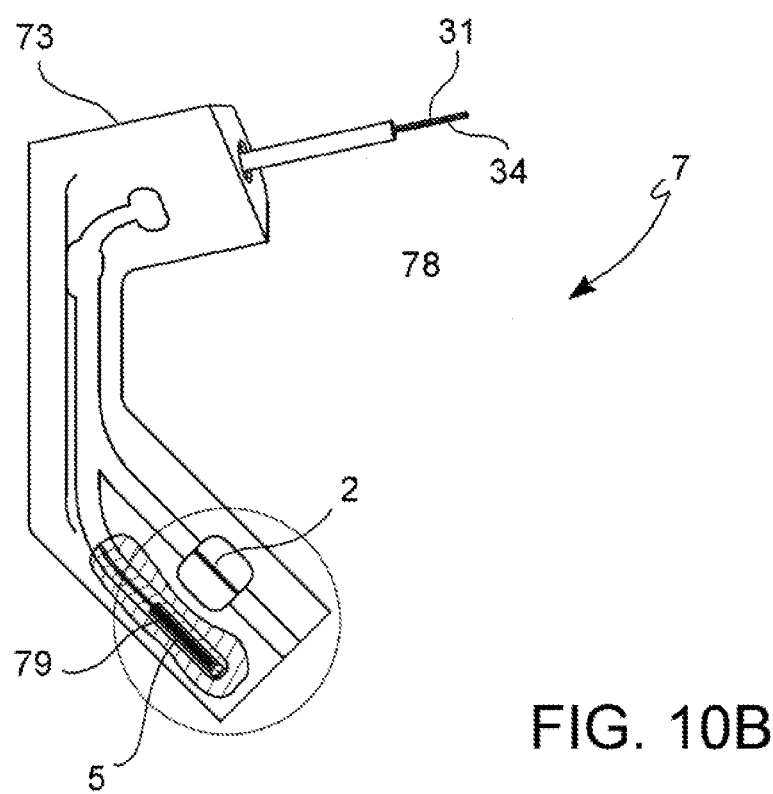

FIGS. 10A and 10B illustrate an implementation option (corresponding to the functional illustration shown in FIG. 3) which provides an optical fiber containing the strain sensor 2 and another optical fiber dedicated to temperature sensor 5.

In particular, FIGS. 10A and 10B illustrate an implementation variant with a single truncated optical fiber, in which the pre-formed frame comprises an aluminum housing 73, configured to contain the stretch of optical fiber comprising the one or more optical fiber strain sensors 2, in which a recess 71 is obtained for fixing the optical fiber "in sight". In this variant of embodiment, a second truncated optical fiber containing the (reference) FBG temperature sensor is integrated into the housing 73.

In this implementation option, the pre-formed frame 7 further comprises a capillary tube 78 (e.g., stainless steel) adapted to contain and protect the connection optical fiber 31, 34, exiting from the pre-formed frame, and a further output capillary tube 79 adapted to contain the connection optical fiber 34 dedicated to the temperature sensor 5.

The optical fiber containing the strain sensor is pre-assembled and fixed by means of binder or adhesive 77 (e.g., cementitious adhesive) in the aluminum housing 73 (as shown in the section view in FIG. 9B).

The temperature measurement sensor 5, surrounded by its own capillary tube 79, is encapsulated, in the housing 73, in a further steel tube, which is looser to avoid being affected by the thermal stress of the material and to be insensitive to thermal and mechanical deformations of the material of the caliper body. The loose steel tube, which contains the temperature sensor 5, is also fixed by means of binder or adhesive 77 (e.g., cementitious adhesive) in the aluminum housing 73.

Figure 11:
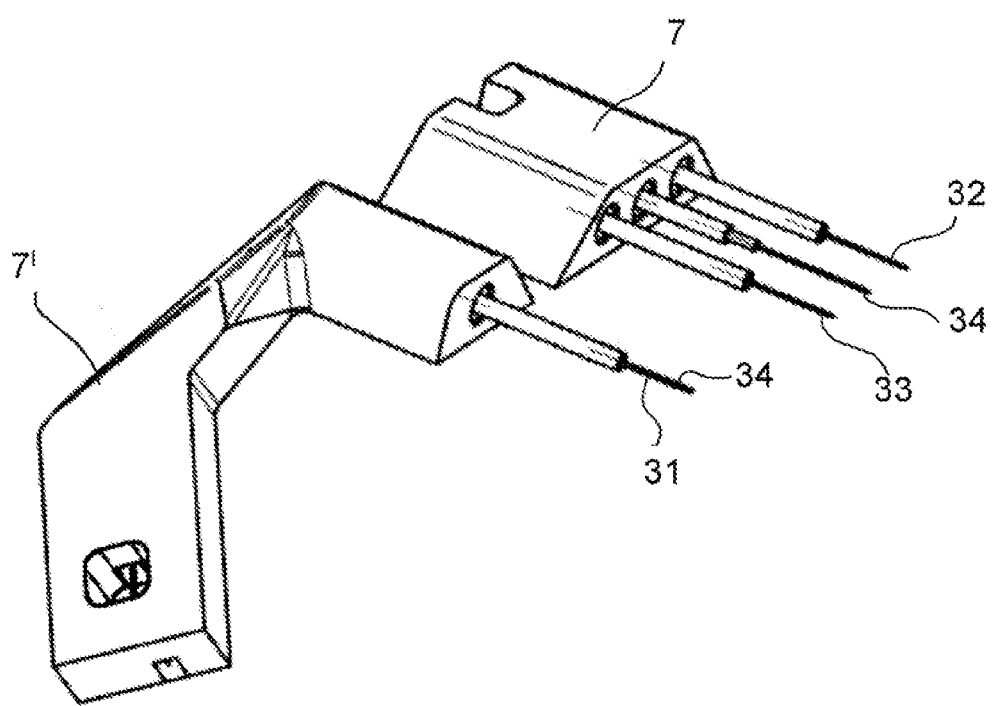

According to an implementation option, as shown in FIG. 11, several pre-formed frames (e.g., a pre-formed frame 7 according to the implementation option shown in FIGS. 9A, 9B, 9C, and a pre-formed frame T according to the implementation option shown in FIGS. 10A and 10B) may be merged by means of a mounting bracket before integration in the caliper.

The at least one pre-formed frame T, T (in any of the implementation options described above) is then fixed in the desired position in the body of the brake caliper.

Figure 7:
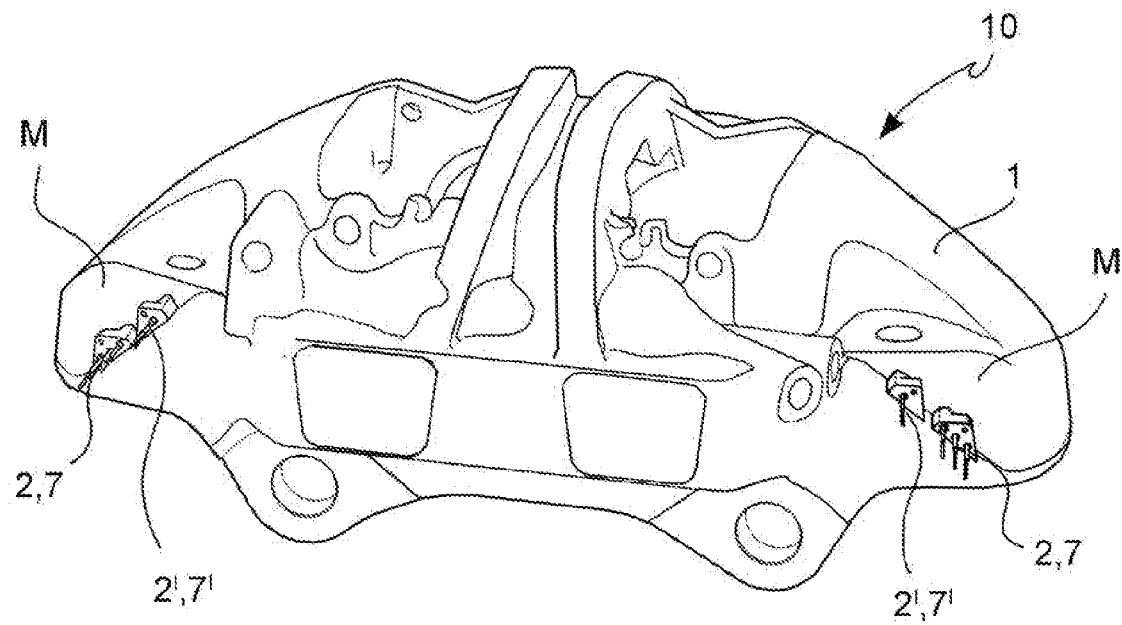
FIGS. 7 and 8 show perspective views of two possible further embodiments of a sensorized brake caliper according to the present invention.

For example, FIG. 7 shows four sensor assembles 2 of a different type, i.e., two pairs of sensor assemblies, each pair comprising a sensor assembly 2', in a respective preformed frame T, in single-fiber configuration (therefore, with reflected photonic signal, as in the implementation option of FIGS. 10A, 10B) and a sensor assembly 2, in a respective pre-formed frame 7, in through configuration with first optical fiber 32 and second optical fiber 33 (therefore, with the transmitted signal, as in the option of embodiment of FIGS. 9A, 9B, 9C). In the example shown in FIG. 7, all the sensor assemblies further provide a third optical fiber 34 for the temperature sensor. Therefore, al sensor assemblies are incorporated in symmetrical lateral positions of the brake caliper body.

Figure 8:
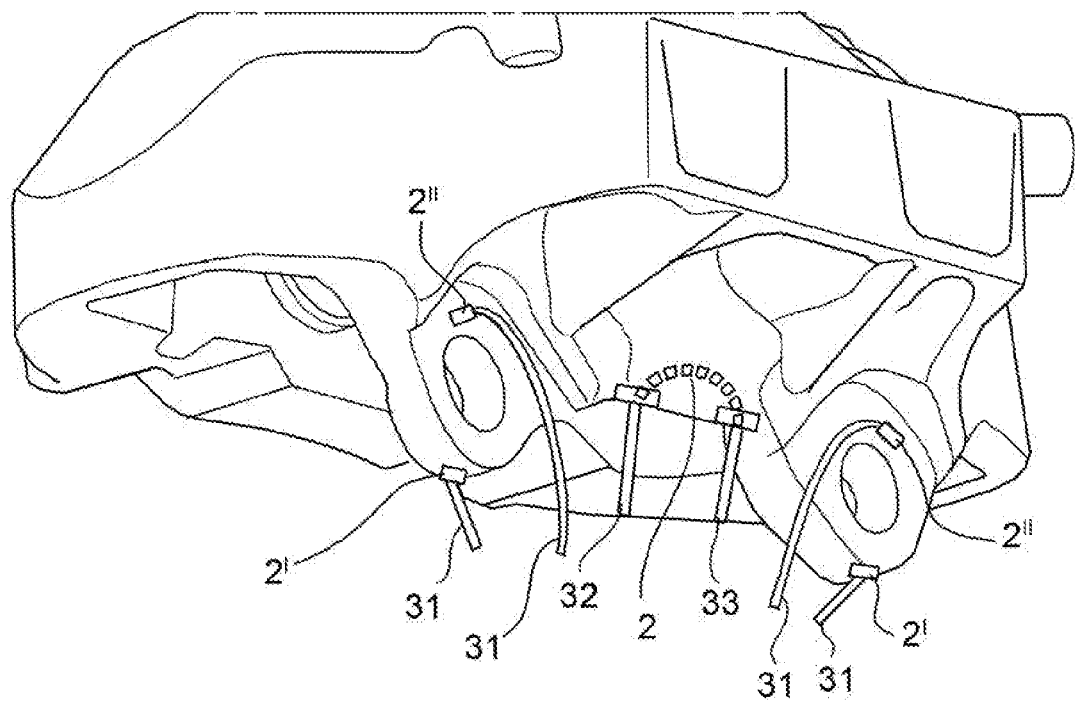

FIG. 8 illustrates another implementation example, in which at least one sensor assembly 2 is in configuration with separate fibers 32, 33 (therefore, with transmitted photonic signal, in which one of the two fibers acts as input fiber and the other fiber acts as output fiber, according to the direction of illumination) incorporated in a lower position of the brake caliper between the two fixings.

Ether additionally or alternatively, at least one sensor assembly 2' in single-fiber configuration (31) incorporated in the brake caliper portion intended for fixings may be provided (two of such sensor assembles 2' arranged in the lower part of two respective caliper portions intended for fixings are shown in FIG. 8).

Either additionally or alternatively, at least one sensor assembly 2" may be provided in single-fiber configuration 31 embedded in the brake caliper portion intended for fixings in a 45° direction with respect to the vertical through the center of the fixing holes (FIG. 8 shows two such sensor assemblies 2", arranged in two respective caliper portions intended for fixings).

According to an embodiment of the method, the step of incorporating at least one deformation and/or strain sensor 2 in the body of the brake caliper comprises welding an optical fiber, in which the aforesaid at least one deformation and/or strain sensor 2 is obtained at a predefined portion of the surface of the brake caliper body.

According to an implementation option of the aforesaid embodiment, the aforesaid welding is carried out by means of Ultrasonic Additive Manufacturing, UAM, known in itself, which allows the sensors to be incorporated into the metal body of the caliper by means of metal layers.

According to another implementation option of the aforesaid embodiment, the aforesaid welding is carried out by means of Laser Technologies, which are known themselves, able to carry out direct welding of the fiber in the body of the caliper.

The aforesaid embodiment offers the technical advantage of being able to use a simpler and more cost-effective construction variant of the sensor, because it does not need to be designed to withstand the temperatures of the melting process and subsequent heat treatments, but lower temperatures, by virtue of the characteristics of the mentioned processes.

From the above, it is apparent that the most varied implementation options of the method are possible, and comprised in the invention, which provide the incorporation of any number of sensors and/or assemblies of fiber-optic deformation and/or strain sensors 2, in any desired position of the brake caliper, with the only constraint of not altering the functionality of the brake caliper itself at all.

According to an embodiment of the method, the aforesaid steps of receiving and generating are performed by a single optical reading/interrogation unit 4 integrated and/or housed in the brake caliper 10.

According to an embodiment of the method, the steps of the method are performed by a plurality of brake calipers 10 of disc brake calipers of a braking system of a vehicle.

In this case, according to an implementation option, the aforesaid steps of receiving and generating are performed by a single optical reading/interrogation unit 4, operationally connected to all the brake calipers 10 of the aforesaid plurality of disc brake calipers of a braking system of a vehicle. According to another implementation option, the aforesaid steps of receiving and generating are performed by a plurality of optical reading/interrogation units 4, each operationally connected to one or more brake calipers 10 of the aforesaid plurality of disc brake calipers.

According to an embodiment, the method includes before the step of processing, the step of transmitting the aforesaid at least one first electrical signal E and/or second electrical signal Et to a control unit 20.

According to possible implementation examples, the one or more optical reading/interrogation units 4 and one or more control units 20 are installed in one, or two, or four vehicle control units.

In this case, according to an implementation option, the step of processing comprises calculating the braking force and/or torque BF/BT, by a processor of the control unit 20 by means of one or more algorithms run by one or more software programs, on the basis of the aforesaid at least one first electrical signal E.

According to another implementation option, the step of processing comprises calculating the braking force and/or torque BF/BT, by a processor of the control unit 20 by means of one or more algorithms run by one or more software programs, on the basis of a first electrical signal E and second electrical signal Et.

According to a further implementation option, the step of processing comprises calculating the braking force and/or torque BF/BT, by a processor of the control unit 20 by means of one or more algorithms run by one or more software programs, on the basis of the aforesaid plurality of first electrical signals Ea, Eb, Ec and of the aforesaid at least one second electrical signal Et.

According to a more specific implementation option, the step of calculating comprises calculating the damping force and/or braking torque BF/BT by means of predetermined non-linear relationships between the braking force and/or torque and the deformation and/or strain detected by at least one deformation and/or strain sensor 2 in the respective position in which it is incorporated in the brake caliper.

Such predetermined non-linear relationships are, for example, represented by computerized models or look-up tables stored to be accessible by the processor of the control unit 20.

The aforesaid predetermined non-linear relationships are, for example, determined by means of steps of testing and/or characterizing and/or calibrating performed after at least one deformation and/or strain sensor 2 was incorporated in the brake caliper 10, and before using the brake caliper 10.

According to an implementation example, the aforesaid steps of testing and/or characterizing and/or calibrating may comprise functional and/or structural simulations, e.g., calculations based on finite element methods (FEM).

The aforesaid calculations and processing a low defining non-linear relationships between strain measurements in one or more points of the caliper and the braking force/torque, thus allowing estimating the braking force/torque on the basis of the performed strain measurements.

According to an embodiment of the method, the step of processing comprises obtaining a dynamic measurement of the trend of the braking force and/or torque BT/BF in real-time, on the basis of the time evolution of the detected deformation and/or strain.

According to an implementation option, the method comprises the further step of detecting possible malfunctions of fiber-optic sensors 2.

It is worth noting that the method described above, in all its various embodiments, can be applied, mutatis mutandis, by detecting stresses/strains not on the brake caliper, but also (or exclusively) on a suspension part of a vehicle to which a brake caliper is connected.

Therefore, a method is described for detecting and measuring a braking force and/or braking torque deriving from the actuation of a friction brake by means of detection performed in at least one suspension part of a vehicle to which a brake caliper is connected.

Such method comprises, first of al, the step of incorporating at least one deformation and/or strain sensor, at a predefined and fixed position, in a portion of the material of the aforesaid suspension part of a vehicle susceptible to deforming due to a reaction force which is applied on the suspension part of the vehicle, by means of the brake caliper, at the braking force and/or torque during a braking event. In this manner, the deformation and/or strain acting locally in the aforesaid position, in which at least one deformation and/or strain sensor is located, is representative of the braking force and/or braking torque.

The aforesaid at least one deformation and/or strain sensor is a fiber-optic strain sensor of the fiber Bragg grating type.

The method then comprises the steps of detecting, by means of each of the at least one fiber-optic strain sensor, the local deformation and/or strain acting in the respective position, and generating a respective at least one first photonic signal representative of the detected deformation and/or strain; then, receiving the aforesaid at least one first photonic signal, by an optical reading/interrogation unit, optically connected to the at least one fiber-optic strain sensor; then, generating, by the optical reading/interrogation unit, at least one first electrical signal representative of the local detected deformation and/or strain, on the basis of the at least one first photonic signal received; finally, processing the aforesaid at least one first electrical signal representative of the deformation and/or strain to obtain a measurement of the braking force and/or braking torque.

According to an implementation option of the aforesaid method, the at least one deformation and/or strain sensor arranged at the suspension is further configured to detect further forces acting on the suspension elements.

With reference again to FIGS. 1-14, a sensorized brake caliper 10 is described below for a braking system of the vehicle 1000.

Such sensorized brake caliper 10 comprises a brake caliper 10 with a brake caliper body 1, at least one deformation and/or strain sensor 2, and first photonic connection means 3.

The brake caliper comprising a brake caliper body 1 made of a material susceptible to deformation due to a reaction force which is applied on the brake caliper at a braking force and/or torque during a braking event. The body 1 of the brake caliper comprises a portion of the aforementioned material M the deformation and/or strain S of which is locally representative of the braking force and/or braking torque BF/BT applied on the braking system.

The at least one deformation and/or strain sensor 2 is incorporated in the portion of material susceptible to deformation M, at a respective predetermined fixed respective position, and comprises at least one fiber-optic strain sensor of the fiber Bragg grating type (FBG sensor), configured to detect the deformation and/or strain S acting locally in the respective position and to generate a respective at least one first photonic signal L representative of the detected deformation and/or strain S.

The first photonic connection means 3 are connected to aforesaid fiber-optic strain sensor 2 and are adapted to be connected to an optical reading/interrogation unit 4 to transmit the aforesaid at least one first photonic signal L.

According to an embodiment, the sensorized caliper 10 further comprises at least one temperature sensor 5, incorporated in the aforesaid portion of material M of the brake caliper body, near the fiber-optic strain sensor 2, at a predefined and fixed position, which comprises at least one fiber-optic temperature sensor of the fiber Bragg grating type, configured to detect a temperature value T present in the respective position, and to generate a respective at least one second photonic signal Et representative of the detected temperature.

The sensorized caliper 10 further comprises second photonic connection means 6, connected to the fiber-optic temperature sensor 5, and adapted to be connected to an optical reading/interrogation unit 4 to transmit the aforesaid at least one second photonic signal Lt.

According to an embodiment, the sensorized caliper 10 further comprises an optical reading/interrogation unit 4, which can be connected to a remote control unit 20 external to the brake caliper.

The optical reading/interrogation unit 4 (as illustrated above describing the method according to the invention) is optically connected to the first photonic connection means 3 and is configured to activate said at least one fiber-optic strain sensor 2 transmitting a first optical activation radiation OA, and to receive the at least one first photonic signal L.

Furthermore, the optical reading/interrogation unit 4 is configured to generate at least one first electrical signal E representative of the detected deformation and/or strain S, on the basis of the at least one first photonic signal L received. The aforesaid at least one second electrical signal E is adapted to be transmitted to the remote control unit 20.

Therefore, in the embodiment described above, the optical reading/interrogation unit 4 (according to any of the implementation variants described above in the description of the method) is integrated into the sensorized brake caliper 10.

In particular, according to an implementation option of the sensorized brake caliper, the optical reading/interrogation unit 4 is further connected to the second photonic connection means 6 and is configured to activate the fiber-optic temperature sensor 5 transmitting a second optical activation radiation Q, and to receive also the at least one second photonic signal Lt.

In this case, the optical reading/interrogation unit 4 is further configured to generate at least one second electrical signal Et representative of the detected temperature, on the basis of the at least one second photonic signal Lt received. The at least one second electrical signal Et Is adapted to be transmitted to the remote control unit 20.

According to an implementation option, the first photonic connection means 3 comprise a first connection optical fiber 31 adapted to convey the first optical activation radiation OA from the optical reading/interrogation unit 4 to the at least one fiber-optic strain sensor 2 and to convey the first photonic signal L having a first reflected optical spectrum L from at least one fiber-optic strain sensor 2 towards the optical reading/interrogation unit 4.

According to an additional implementation option of the sensorized brake caliper, the optical reading/interrogation unit 4 is further configured to activate ha least one fiber-optic strain sensor 2 by transmitting a first optical activation radiation OA.

According to an implementation option, the first photonic connection means 3 comprise a first input connection optical fiber 32 adapted to convey the first optical activation radiation OA from the optical reading/querying unit 4 to the at least one fiber-optic strain sensor 2, and further comprise an output connection optical fiber 33, adapted to convey the first photonic signal L comprising a first transmitted optical spectrum L from the at least one fiber-optic strain sensor 2 towards the optical reading/querying unit 4.

According to an embodiment, the at least one temperature sensor 5 is made by means of a fiber Bragg grating made in the same optical fiber in which the at least one deformation and/or strain sensor 2 is made and is arranged to be insensitive to thermal and mechanical deformations of the material of the caliper body.

In this case, according to an implementation option (shown in FIG. 4B), the fiber-optic temperature sensor 5 is connected to the optical reading/interrogation unit 4 by means of the first connection optical fiber 31, the optical activation radiation OAt is transmitted, wavelength-multiplexed with the optical activation radiation OA of the strain sensor, through the first connection optical fiber 31, and the second photonic signal Lt comprises a second optical spectrum Lt reflected by the temperature sensor 5, wavelength-multiplexed with said first optical spectrum L reflected by the strain sensor 2, which reaches the optical reading/querying unit 4 through the first connection optical fiber 34.

According to another implementation option (shown in FIG. 4A), the fiber-optic temperature sensor 5 is connected to the optical reading/interrogation unit 4 by means of the aforesaid first input connection optical fiber 32 and second output connection optical fiber 33, the optical activation radiation OAt is transmitted, wavelength-multiplexed with the optical activation radiation OA of the strain sensor, through the first input connection optical fiber 32, and the second photonic signal Lt comprises a second optical spectrum Lt transmitted by the temperature sensor 5, wavelength-multiplexed with the first optical spectrum L transmitted by the strain sensor 2, which reaches the optical reading/interrogation unit 4 through the second output connection optical fiber 33.

According to a further implementation option, the aforesaid second photonic connection means 6 comprise a third connection optical fiber 34 adapted to convey the second optical activation radiation OAt from the optical reading/interrogation unit 4 to the fiber-optic temperature sensor 5, and to convey the second photonic signal Lt having a second reflected optical spectrum Lt from the fiber-optic strain sensor 5 towards the optical reading/interrogation unit 4.

According to an implementation example, each connection between each fiber in which the fiber Bragg grating type sensors are obtained and a respective connection optical fiber to the optical reading/interrogation unit 4 is made by means of a fiber spice or a detachable photonic connection element (optical connector).

According to an embodiment, the sensorized caliper 10 comprises a plurality of deformation and/or strain sensors 2a, 2b, 2c, each made by means of a respective Bragg grating, associated with a respective central operating wavelength ($\lambda a$, $\lambda b$, $\lambda c$); the aforesaid Bragg gratings are obtained in one or more fiber-optic elements, wherein each of said one or more fiber-optic elements is incorporated in the aforesaid portion of material M of the body of the brake caliper 10, in a respective position and with a respective predefined and fixed spatial development.

Each of the aforesaid deformation and/or strain sensors 2a, 2b, 2c is configured to generate a respective photonic signal of a plurality of first photonic signals La, Lb, Lc.

The optical reading/interrogation unit 4 is configured to receive the aforesaid plurality of first electrical signals La, Lb, Lc to generate a respective plurality of first photonic signals Ea, Eb, Ec a received on the basis of the plurality of first photonic signals La, Lb, Lc received, to transmit such plurality of first electrical signals Ea, Eb, Ec to a control unit 20.

According to an implementation option, each of the one or more fiber-optic elements comprises a plurality of deformation and/or strain sensors 2a, 2b, 2c, obtained in different stretches of the fiber-optic element and associated with different respective operating wavelengths $\lambda a$, $\lambda b$, $\lambda c$.

The optical reading/interrogation unit 4 is further configured to transmit respective optical activation radiations OAa, OAb, OAc to the plurality of deformation and/or strain sensors 2a, 2b, 2c, at the respective operating wavelengths $\lambda a$, $\lambda b$, $\lambda c$, by means of wavelength-division multiplexing (WDM) transmission techniques, and to receive and distinguish the respective reflected optical spectra, corresponding to the respective first photonic signals La, Lb, Lc, by each of said plurality of deformation and/or strain sensors 2a, 2b, 2c, by means of de-multiplexing with wavelength-division multiplexing (WDM) techniques.

According to an embodiment, the sensorized brake caliper 10 further comprises at least one pre-formed frame and/or housing 7, having predetermined geometry and dimensions, incorporated in the sensorized caliper 10, during the manufacturing of the sensorized caliper.

Such at least one pre-formed frame and/or housing 7 contains the at least one deformation and/or strain sensor 2, so that each of the aforesaid at least one deformation and/or strain sensor 2 is incorporated in the desired portion of material M of the body of the sensorized caliper.

Some implementation examples of the pre-formed frame or package 7 are shown in FIGS. 9A, 9B, 10 A and 10B and have already been described earlier in the explanation of the method according to the invention.

According to an implementation option, the sensorized caliper 10 further comprises an optical fiber welded to the surface of the brake caliper body, in which at least one deformation and/or strain sensor 2 and/or the at least one temperature sensor 5 are incorporated in such optical fiber.

Figure 12:
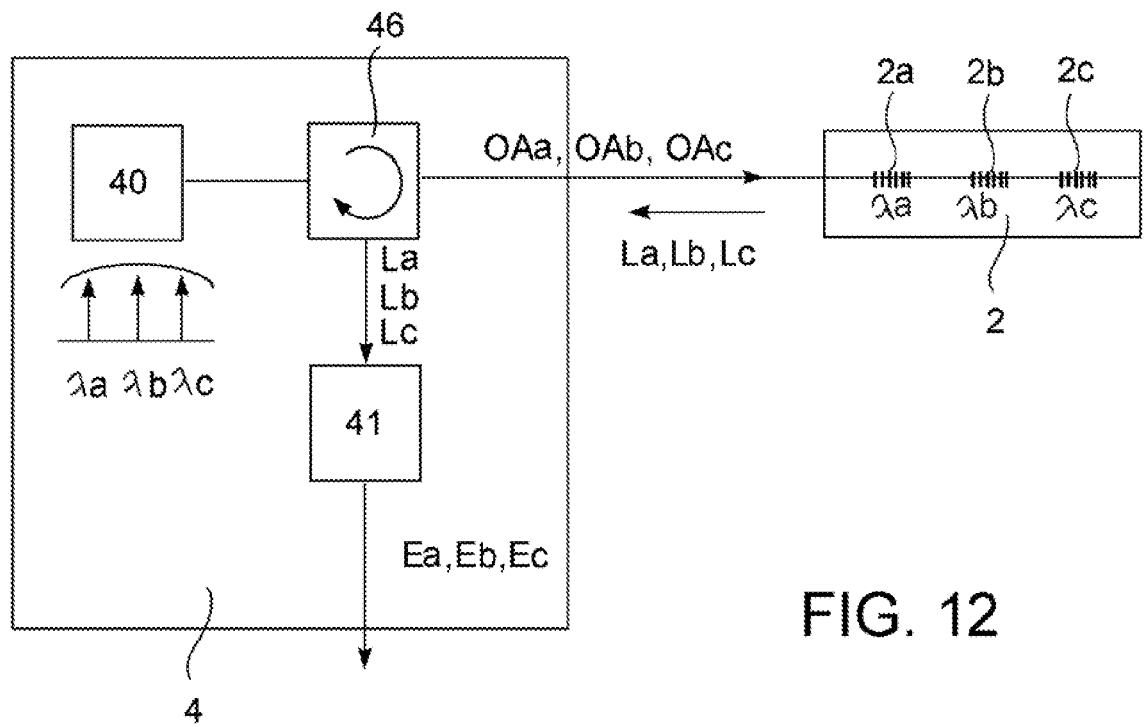
FIGS. 12-14 are function block charts of respective implementation options of an optical reading/querying unit comprised in the aforesaid system for detecting and measuring a braking force and/or braking torque.
Figure 13:
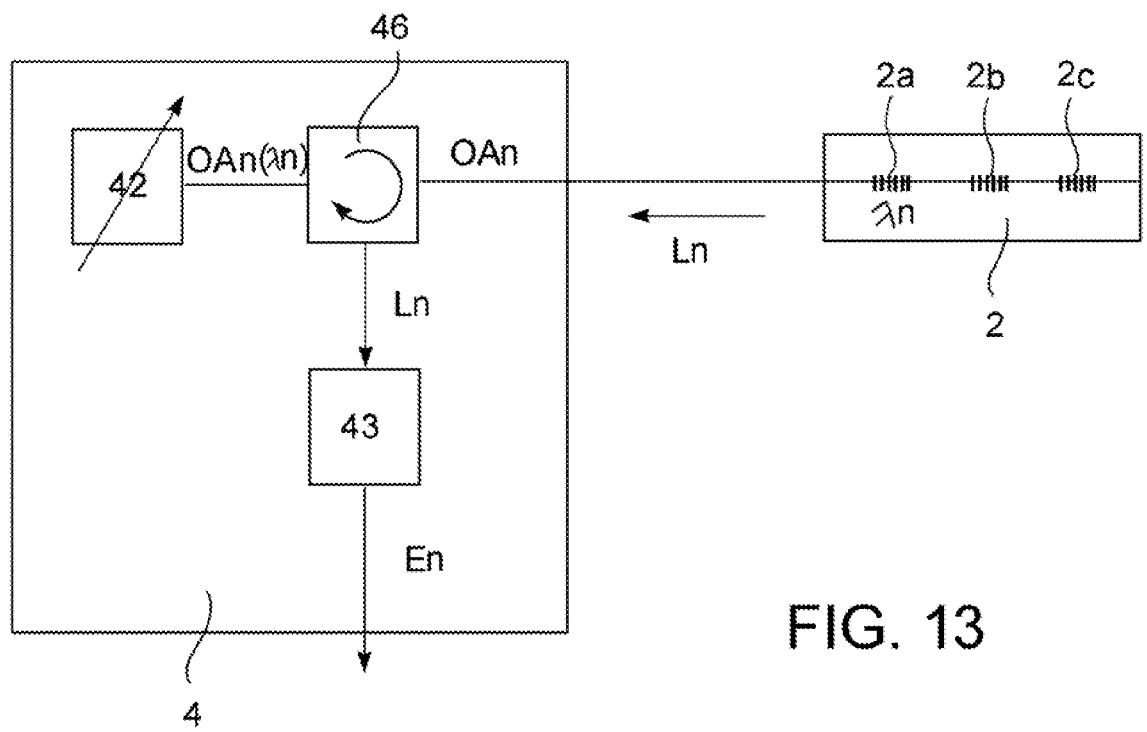
Figure 14:
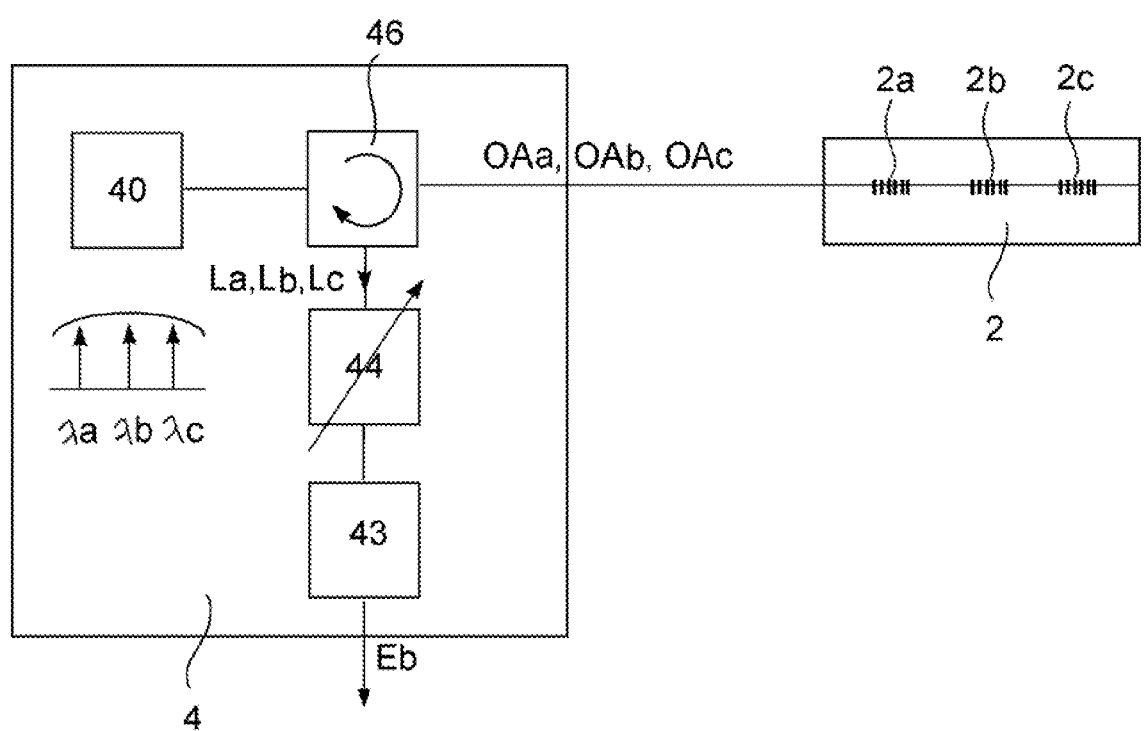

With reference to FIGS. 12-14, further illustrative details will now be provided, by way of example, with reference to reading/interrogation unit 4.

According to an embodiment of the sensorized brake caliper 10, the optical reading/interrogation unit 4 comprises a broadband optical radiation source 40, an optical circulator 46, and at least one opto-electronic spectrometer receiver 41.

The broadband optical radiation source 40 is configured to transmit one first optical activation radiation OA or a plurality of second optical activation radiations OAa, OAb, OAc and/or one second optical activation radiation OAt.

The at least one opto-electronic spectrometer receiver 41 is configured to select the wavelength and/or the plurality of wavelengths to be received and is also configured to receive the aforesaid first photonic signal L, or the aforesaid plurality of first photonic signals La, Lb, Lc and convert them into the first electric signal E, or the plurality of first electric signals Ea, Eb, Ec, and/or to receive the above mentioned second photonic signal Lt and convert it into the second electric signal Et.

In this embodiment, multiplexed FBG sensors in the wavelength domain (WDM) are queried using a technique based on a broad spectrum source and spectrometer (as shown in FIG. 12).

The broad-spectrum source may comprise, for example, a super-luminescent diode or a spontaneous emission source (such as a semiconductor optical amplifier or an erbium-doped fiber optical amplifier) and is used to illuminate (by means of the input port and the through port of the optical circulator 46) FBG sensors 2a, 2b, 2c characterized by reflectivity peaks at different wavelengths (λa, λb, λc) not mutually superimposed.

The different photonic signals La, Lb, Lc, at their respective wavelengths, are retro-reflected by FBG sensors (in the example shown in FIG. 12) and are coupled to a spectrometer 41 through the output port of the optical circulator 46.

The spectrometer 41 is, for example, a dispersive element, typically made by means of a Phase Grating Volume, able to spatially separate the different spectral components of the signal. Such spatially separated signal components are coupled to an array of photo-receivers capable of generating signals with intensity values corresponding to the various wavelengths.

Each photo-receiver is sensitive to optical radiation corresponding to a well-defined spectral region, thus providing the possibility to reconstruct the entire spectrum, in the spectral range of interest.

According to another embodiment of the g brake caliper 10 (illustrated in FIG. 13), the optical reading/interrogation unit 4 comprises a tunable optical radiation source 42, an optical circulator 46 and an opto-electronic spectrometer receiver 43.

The tunable optical radiation source 42 is configured to transmit the desired optical radiation OAn (at the respective wavelength λn) between the possible first optical activation radiation OAa, OAb, OAc, or the second optical activation radiation OAt, at the wavelength λt, at a given time.

The emitted optical radiation OAn illuminates (by means of the input port and the through port of the optical circulator 46) the optical fiber containing the FBG sensors, and determines a response by the FBG sensors sensitive to the wavelength λn which generates a redo-reflected photonic signal Ln, which is coupled to the photo-dode receiver 43 through the output port of the optical circulator 46.

The photo-electronic receiver 43, configured to receive the aforesaid first M-reflected photonic signal Ln and convert it into a first electrical signal En (or similarly to receive the second photonic signal Lt and convert it Into said second electrical signal Et).

In this embodiment the multiplexed FBG sensors in the wavelength domain (WDM) are interrogated using a tunable laser and h based technique.

According to various implementation options, the tunable optical radiation source 42 is a tunable laser, which can be used in the "agile tunable" or "swept wavelength" modes which are known in themselves.

According to another embodiment of the sensorized caliper 10 (diagrammatically illustrated in FIG. 14), the optical reading/interrogation unit 4 is entirely made by means of a single photonic integrated circuit using PIC technology. In this case, such single integrated photonic circuit comprises a broadband optical radiation source 40, at least one wavelength optical filtering element 44, and at least one opto-electronic photo-diode receiver 43.

The broadband optical radiation source 40 is configured to transmit on first optical activation radiation OA and/or a plurality of second optical activation radiations OAa, OAb, OAc, and/or one second optical activation radiation OAt.

The emitted optical radiation (which comprises the optical radiations OAa, OAb, OAc in the example in FIG. 14), by means of the input port and the through port of the optical circulator 46, illuminates the optical fiber containing the FBG sensors, each of which reflects a respective photonic signal La, Lb, Lc. The photonic signal WDM as a whole given by the sum of the signals La, La, Lc, each at its own and different wavelength, is conveyed to the input of the at least one filter-optic element 44, through the output port of optical circulator 46.

The at least one wavelength optical filtering element 44, which can be tuned in the surround of the wavelength of the interrogated fiber Bragg grating, to select a respective photonic signal (the photonic signal Lb at the wavelength λb in the example in FIG. 14). The at least one optical filtering element 44, being tunable, can be tuned around different wavelengths, to select in sequence or at different times depending on what is desired, the photonic signal reflected by any of the FBG sensors.

At least one opto-electronic photo-diode receiver 43 is configured to receive the photonic signal selected among the aforesaid photonic signals and convert it into one or more electrical signals, and/or to receive the second photonic signal Lt, if selected, and convert it into the second electrical signal Et.

With reference to the above descriptions of different embodiments of the reading/interrogation unit 4 (and in the light of FIGS. 12-14), it can be easily understood that a completely similar description, mutatis mutandis, applies in the case in which the three FBG sensors comprise two FBG strain sensors and one FBG temperature sensor, or if only one fiber-optic strain sensor and one FBG temperature sensor are provided, or if any number of fiber-optic strain sensors and one FBG temperature sensor are provided.

According to an implementation option, the brake caliper body is made of aluminum or cast iron. More specifically, the material of which the portion of the material of the brake caliper, in which at least one deformation and/or strain sensor is incorporated, is made of aluminum or cast iron or in general of aluminum alloys or CFRP composite materials.

It is worth noting that, as previously illustrated, a peculiar feature of the technical solution described here is the fact that the deformation and/or strain sensors are incorporated into the body of the brake caliper itself and detect the deformations and strains applied to the brake caliper body during braking. This clearly differentiates the solution described here, both from a structural and functional point of view, from technical solutions that provide the incorporation of force sensors in consumable parts of the brake caliper, such as brake pads.

According to a different possible embodiment, the sensorized brake caliper is either a fixed brake caliper or a floating brake caliper.

A system 100 for detecting and measuring a braking force and/or a braking torque BF/BT deriving from the actuation of a vehicle braking system, by means of detection performed in at least one brake caliper 10 of the braking system, will now be described with reference to FIGS. 1-5.

Such system 100 comprises at least one sensorized caliper 10 according to any of the embodiments described above, and also an optical reading/interrogation unit 4, optically connected to the first photonic connection means 3 of the sensorized caliper to receive the aforesaid at least one first photonic signal L, and a remote, control unit 20.

The aforesaid optical reading/interrogation unit 4 is configured to generate at least one first electrical signal E representative of the detected deformation and/or strain S, on the basis of said at least one first photonic signal L received.

The remote control unit 20, external to the caliper 10, is connected to the optical reading/interrogation unit 4 to receive at least one first electrical signal and is configured to process the aforesaid at least one first electrical signal E representative of the deformation and/or strain S to obtain and provide a measurement of the braking force and/or braking torque BF/BT.

According to an implementation option of such a system, the sensorized brake caliper 10 further comprises the fiber optic temperature sensor 5.

In this case, the optical reading/interrogation unit 4 is also connected to the second photonic connection means 6 of the sensorized caliper to receive at least one second photonic signal Lt, and is also configured to generate at least one second electrical signal Et representative of the detected temperature, on the basis of at least one second photonic signal Lt received, and to transmit at least one second electrical signal Et to the remote control unit 20.

The remote control unit 20 is further configured to process also the aforesaid at least one second electrical signal Et to obtain a measurement of the braking force and/or braking torque BF/BT, on the basis of said at least one first electrical signal E and of said at least one second electrical signal Et.

According to an implementation option of the system (show for example in FIG. 6), the optical reading/interrogation unit 4 is integrated and/or housed in the sensorized caliper 10. In this case, electrical signals E are output from the sensorized caliper and directed to the remote control unit.

According to another implementation option of the system (shown, in different variants, in FIGS. 1-5), the optical reading/interrogation unit 4 is external to the sensorized brake caliper 10. In this case, photonic signals L are emitted from the sensorized caliper, on fiber, directed towards the optical reading/interrogation unit 4.

According to an embodiment of the system 100, the optical reading/interrogation unit 4 is further configured to activate each of the fiber-optic strain 2 and/or temperature 5 sensors of the fiber Bragg type, comprised in the sensorized caliper 10, thereby transmitting a first optical activation radiation OA and/or a second optical activation radiation OAt.

According to an implementation option of the system, the optical reading/interrogation unit 4 is further configured to transmit respective optical activation radiations OAa, OAb, OAc to the plurality of deformation and/or strain sensors 2a, 2b, 2c, at the respective operating wavelengths λa, λb, λc, by means of wavelength-division multiplexing WDM transmission techniques, and to receive and distinguish the respective reflected optical spectra La, Lb, Lc by each of the plurality of deformation and/or strain sensors, by means of de-multiplexing with wavelength-division multiplexing (WDM) techniques.

According to different implementation options of the system 100, it comprises, externally to the brake caliper 10, an optical reading/interrogation unit 4 according to any one of the design variants of the optical reading/interrogation unit 4 illustrated above.

In particular, according to an implementation option of the system 100, the optical reading/interrogation unit 4 comprises a broadband optical radiation source 40, an optical circulator 46, and at least an opto-electronic spectrometer receiver 41.

The broadband optical radiation source 40 is configured to transmit one first optical activation radiation OA or a plurality of second optical activation radiations OAa, OAb, OAc and/or one second optical activation radiation Q.

The at least opto-electronic receiver with spectrometer 41 is configured to select the wavelength and/or the plurality of wavelengths to be received and is also configured to receive the aforesaid first photonic signal L, or the aforesaid plurality of first photonic signals La, Lb, Lc and convert them into the first electric signal E, or the plurality of first electric signals Ea, Eb, Ec, and/or to receive the aforesaid second photonic signal Lt and convert it into the second electric signal Et.

According to another implementation option of the system 100, the optical reading/interrogation unit 4 comprises a tunable optical radiation source 42, an optical circulator 46, and at least one add opto-electronic spectrometer receiver 43.

The tunable optical radiation source 42 is configured to transmit the desired optical radiation OAn (at the respective wavelength ag) between the possible first optical activation radiation OAa, OAb, OAc, or the second optical activation radiation OAt, at the wavelength λt, at a given time.

The emitted optical radiation OAn illuminates (by means of the input port and the through port of the optical circulator 46) the optical fiber containing the FBG sensors, and determines a response by the FBG sensors sensitive to the wavelength b, which generates a recto-reflected photonic signal Ln, which is coupled to the photo-diode receiver 43 through the output port of the optical circulator 46.

The at least one photo-diode opto-electronic receiver 43 is configured to receive the aforesaid first rectro-reflected photonic signal Ln and convert it into said first electrical signal En (or similarly to receive the second photonic signal Lt and convert it into the second electrical signal Et).

According to another implementation option of the system 100, the optical reading/interrogation unit 4 is entirely made by means of a single photonic integrated circuit using PIC (Photonic Integrated Circuit) technology. In this case, such single integrated photonic circuit comprises a broadband optical radiation source 40, at least one wavelength optical filtering element 44, and at least one opto-electronic photo-diode receiver 43.

The broadband optical radiation source 40 is configured to transmit one first optical activation radiation OA or a plurality of second optical activation radiations OAa, OAb, OAc, and/or one second optical activation radiation OAt.

The emitted optical radiation (which comprises the optical radiations OAa, OAb, OAc in the example in FIG. 14), by means of the input port and the through port of the optical circulator 46, illuminates the optical fiber containing the FBG sensors, each of which reflects a respective photonic signal La, Lb, Lc. The photonic signal WDM as a whole given by the sum of the signals La, Lb, Lc, each at its own and different wavelength, is conveyed to the input of the at least one titer-optic element 44, through the output port of optical circulator 46.

The at least one wavelength optical filtering element 44 can be tuned in the of the wavelength of the queried fiber Bragg grating, in order to select a respective photonic signal (the photonic signal Lb at the wavelength λb in the example in FIG. 14). The optical filtering element 44, being tunable, can be tuned to different wavelengths, in order to select in sequence or at different times according to what is desired, the photonic signal reflected by any one of the FBG sensors.

The opto-electronic photo-diode receiver 43 is configured to receive the photonic signal selected among the aforesaid photonic signals and convert it into one or more electrical signals, and/or to receive the second photonic signal Lt, if selected, and convert it into the second electrical signal Et.

With reference to the above descriptions of different embodiments of the reading/querying unit 4 (and in the it of FIGS. 12-14), it can be easily understood that a completely similar description, mutatis mutandis, applies in the case in which the three FBG sensors comprise two FBG strain sensors and one FBG temperature sensor, or if only one fiber-optic strain sensor and one FBG temperature sensor are provided, or if any number of filer-optic strain sensors and one FBG temperature sensor are provided.

Figure 15:
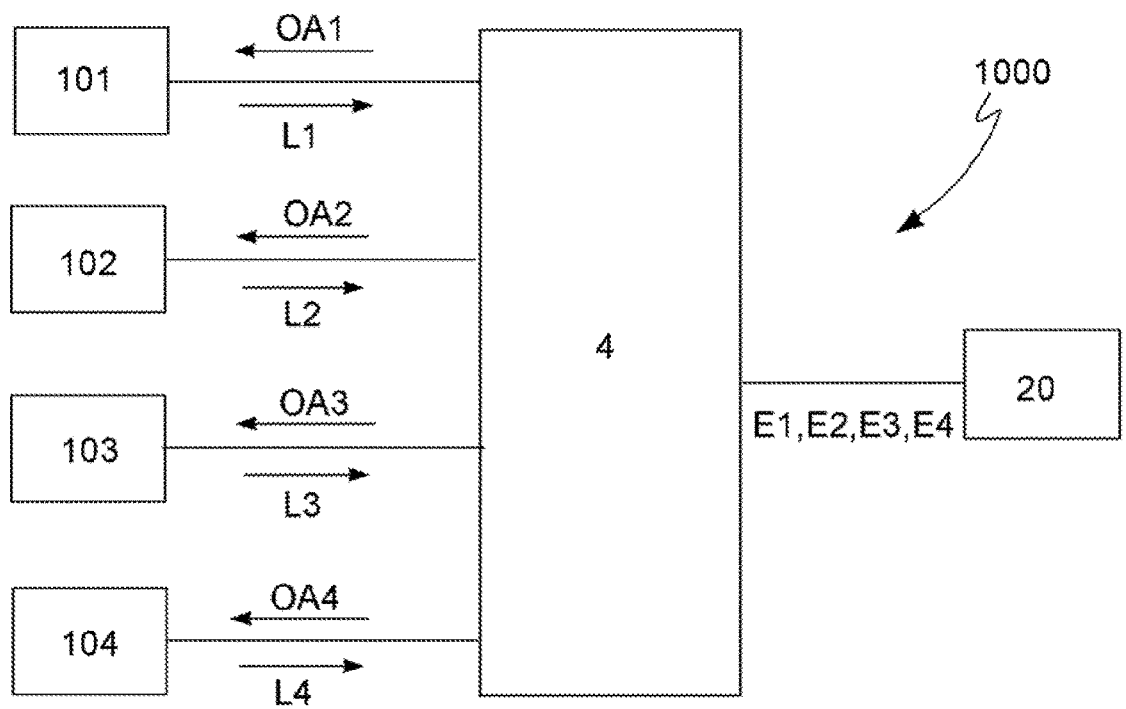
FIGS. 15 and 16 illustrate two respective embodiments of a braking system according to the invention, comprising a plurality of the aforesaid sensorized calipers.

With reference to FIG. 15, a further embodiment of the system 100 for detecting and measuring a braking force and/or braking torque BF/BT is now described.

In this case, the system 100 comprises a plurality of sensorized calipers (101-104) belonging to the braking system of the vehicle and a single optical reading/interrogation unit 4 operationally connected to each sensorized caliper 101, 102, 103, 104 of the aforesaid plurality of sensorized calipers.

The optical reading/interrogation unit 4 is configured to transmit respective optical activation radiations OA1-OA4 to the fiber-optic strain sensors 101-104 and to receive a respective photonic signals L1-L4 (either reflected or transmitted, according to the chosen configuration) from such different fiber-optic strain sensors.

The optical reading/interrogation unit 4 is also configured to generate a plurality of respective electrical signals E1-E4, in the basis of photonic signals L1-L4, received from the plurality of sensorized brake calipers 101-104.

In the example illustrated in FIG. 15, there are four brake calipers connected to the optical reading/interrogation unit 4. In other implementation examples, such number may be different from four (for example, two or six).

According to another embodiment, the system 100 comprises a plurality of optical reading/interrogation units 4, each operationally connected to one or more brake calipers 10 of the aforesaid plurality of disc brake calipers.

Figure 16:
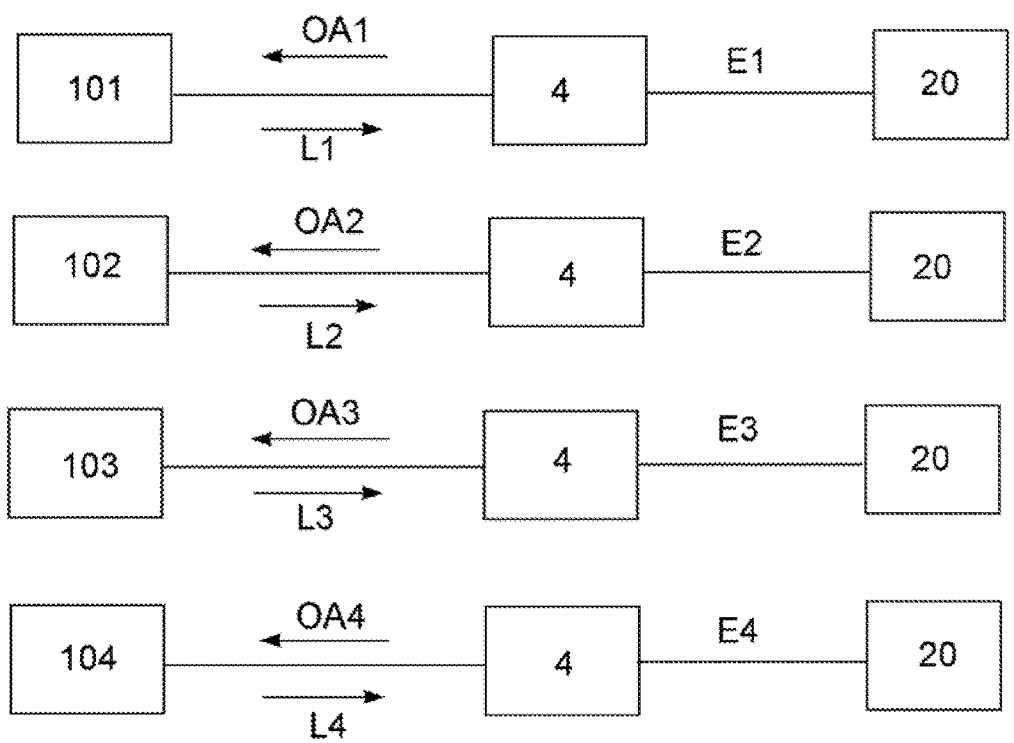

For example, FIG. 16 shows one of the preferred options, with four reading/interrogation units 4, each operationally connected to a respective brake caliper. Another of the preferred options (not shown in the figures) provides the presence of two reading/querying units 4, each connected to two brake calipers.

According to an embodiment of the system 100, the remote control unit 20 comprises at least one processor In which one or more software programs are stored, configured to run an algorithm to calculate the braking force and/or torque, on the basis of the aforesaid at least one first electrical signal E received, or on the basis of the at least one first electrical signal E received of the second electrical signal Et received, or on the basis of the aforesaid plurality of first electrical signals Ea, Eb, Ec and of the second electrical signal Et.

The invention further comprises a braking system for vehicle 1000, comprising a plurality of sensorized brake calipers 10 according to any one of the preceding embodiments of sensorized calipers described above.

The invention further comprises a braking system for vehicle 1000, comprising a system for detecting and measuring 100 a braking force and/or braking torque (resulting from the implementation of the braking system), according to any of the embodiments of the system 100 for detecting and measuring a braking force and/or braking torque described above.

As can be noted, the object of the present invention is fully achieved by the methods and systems illustrated above by virtue of the functional and structural features thereof.

Indeed, the technical solution described here comprises one or more photonic sensors which can be easily and effectively integrated into a caliper (fixed or floating) of a friction brake, for an indirect but precise and reliable measurement of the braking force deriving from an actuation of the brake, or of the torque generated by the clamping force of the brake caliper on the brake disc.

The fiber-optic sensitive element consists of a single sensor or multiple strain sensors based on fiber Bragg grating (FBG) technology.

Advantageously, at least one temperature sensor, also of the FBG technology type, is further provided.

This fiber-optic sensor element can be pre-formed so that it can be easily incorporated into the brake caliper during manufacturing.

The positioning of the pre-formed frame containing the photonic sensors ensures the correct positioning of the strain sensors in the desired points of the brake caliper body, to detect in several points the strain acting on the brake caliper due to the reaction to the braking force.

Advantageously, the possibility of detecting the strain in several points allows determining the braking force and/or torque more accurately, albeit indirectly.

The system consists of the aforesaid g brake caliper, which includes fiber-optic sensors, optically connected to a reading/interrogation unit (which can be remote or also integrated into the brake caliper) for an opto-electronic conversion of the strain information, which, advantageously, can also be based on WDM techniques.

The reading/interrogation unit can be made on the basis of different electro-optical technologies.

Advantageously, such reading/interrogation unit can be achieved by means of silicon-based photonic technologies (e.g., PIC—Photonics Integrated Circuit), which allows making such unit also by integrating it in the sensorized brake caliper or in existing electronic control units.

The control unit of the system can thus determine the braking force and/or torque, with temperature compensation, and over a wide operating range.

Additionally, the system control unit, on the basis of the outputs of the sensorized caliper can calculate further information, such as brake caliper temperature, or it can continuously read the outputs of the sensors with high sampling rate, to calculate the braking torque in real-time, in order to optimize the brake action by controlling the brake actuation (e.g., by detecting a vibration and actively damping it).

Furthermore, several sensorized calipers can be conveniently connected to a single reading interrogation unit.

Further advantages of using fiber-optic sensors for dynamically measuring the brake force are the possibility to use passive sensors (which do not require power supply), high robustness and reliability in a harsh environment, electromagnetic immunity, high sensitivity (detecting both very low and very intense forces), broad bandwidth.

The person skilled in the art may make many changes and adaptations to the embodiments described above or may replace elements with others which are functionally equivalent to satisfy contingent needs without however departing from the scope of the appended claims. AD the features described above as belonging to one possible embodiment may be implemented independently from the other described embodiments.

The invention claimed is:

1. A method for detecting and measuring a braking force and/or a braking torque deriving from actuation of a braking system for vehicle, by detection performed in at least one brake caliper of the braking system, the method comprising:
    incorporating in a caliper body of said at least one brake caliper at least one deformation and/or strain sensor, at a respective predefined and fixed position, in a portion of material of the body of said at least one brake caliper, said material, in which the at least one deformation and/or strain sensor is incorporated, being susceptible to deformation due to a reaction force applied onto the at least one brake caliper due to said braking force and/or braking torque, so that the at least one deformation and/or strain locally acting in said respective predefined and fixed position, in which the at least one deformation and/or strain sensor is located, is representative of the braking force and/or braking torque,
    said at least one deformation and/or strain sensor being a fiber-optic strain sensor of fiber Bragg grating type;
    detecting, by the at least one fiber-optic strain sensor, the at least one deformation and/or strain locally acting in the respective predefined and fixed position, and generating at least one respective first photonic signal representative of the local detected deformation and/or strain;
    receiving said at least one respective first photonic signal, by an optical reading/interrogation unit, optically connected to said at least one fiber-optic strain sensor;
    generating, by the optical reading/interrogation unit, at least one first electrical signal representative of the local detected deformation and/or strain, on the basis of said at least one first photonic signal received;
    processing said at least one first electrical signal representative of the local detected deformation and/or strain to obtain a measurement of the braking force and/or braking torque.

2. The method of claim 1, further comprising:
    incorporating at least one temperature sensor in said portion of material in the body of the at least one brake caliper, said at least one temperature sensor being a fiber-optic temperature sensor of fiber Bragg grating type;
    detecting, by said at least one temperature sensor, a temperature value in the respective predefined and fixed position, and generating at least one respective second photonic signal representative of the detected temperature value;
    receiving said at least one respective second generated photonic signal, by the optical reading/interrogation unit, optically connected to said at least one temperature sensor;
    generating, by the optical reading/interrogation unit, at least one second electrical signal representative of temperature, on the basis of said at least one second photonic signal received;
    wherein the processing step comprises processing the at least one first electrical signal and at least one second electrical signal to obtain a measurement of the braking force and/or braking torque taking a temperature compensation into account.

3. The method of claim 2, wherein said at least one temperature sensor is made of a fiber Bragg grating made in a different optical fiber with respect to the fiber or fibers in which the at least one deformation and/or strain sensor is made,
    wherein the fiber Bragg grating of said at least one temperature sensor is arranged to be insensitive to thermal and mechanical deformations of the material of the caliper body,
    wherein the at least one fiber-optic temperature sensor is connected to the optical reading/interrogation unit by means a third connection optical fiber,
    wherein the optical reading/interrogation unit is configured to activate said at least one fiber-optic temperature sensor by transmitting an optical activation radiation through said third connection optical fiber,
    and wherein said second photonic signal comprises a second optical spectrum reflected by said at least one temperature sensor of fiber Bragg grating type, which reaches the optical reading/interrogation unit through said third connection optical fiber.

4. The method of claim 2, wherein said at least one temperature sensor is made of a fiber Bragg grating made in a same optical fiber in which the at least one deformation and/or strain sensor is made, and is arranged to be insensitive to thermal and mechanical deformations of the material of the caliper body,
    wherein the at least one fiber-optic temperature sensor is connected to the optical reading/interrogation unit by said first connection optical fiber,
    wherein the optical reading/interrogation unit is configured to activate said fiber-optic temperature sensor by transmitting an optical activation radiation through first third connection optical fiber, wavelength-multiplexed with said optical activation radiation of the at least one deformation and/or strain sensor,
    and wherein said second photonic signal comprises a second optical spectrum reflected by the at least one temperature sensor of fiber Bragg grating type, wavelength-multiplexed with said first optical spectrum reflected by the at least one deformation and/or strain sensor, which reaches the optical reading/interrogation unit through said first connection optical fiber.

5. The method of claim 2, wherein the at least one fiber-optic strain sensor is connected to the optical reading/interrogation unit by a first input connection optical fiber and a second output connection optical fiber,
    wherein the optical reading/interrogation unit is configured to activate said at least one fiber-optic strain sensor by transmitting an optical activation radiation through said first input connection optical fiber,
    and wherein said first photonic signal comprises a first optical spectrum transmitted by the at least one deformation and/or strain sensor of fiber Bragg grating type, which reaches the optical reading/interrogation unit through the second output connection optical fiber.

6. The method of claim 5, wherein said at least one temperature sensor is made of a fiber Bragg grating made in a same optical fiber in which the at least one deformation and/or strain sensor is made, and is arranged to be insensitive to thermal and mechanical deformations of the material of the caliper body,
wherein the at least one fiber-optic temperature sensor is connected to the optical reading/interrogation unit by said first input connection optical fiber and second output connection optical fiber,
wherein the optical reading/interrogation unit is configured to activate said at least one fiber-optic temperature sensor by transmitting an optical activation radiation through said first input connection optical fiber, wavelength-multiplexed with said optical activation radiation of the at least one deformation and/or strain sensor,
and wherein said second photonic signal comprises a second optical spectrum transmitted by the at least one deformation and/or temperature sensor of fiber Bragg grating type, wavelength-multiplexed with said first optical spectrum transmitted by the at least one deformation and/or strain sensor, which reaches the optical reading/interrogation unit through said second output connection optical fiber.

7. The method of claim 5, wherein:
the incorporating step comprises incorporating a plurality of deformation and/or strain sensors, each made of a respective fiber Bragg grating, associated with a respective central operating wavelength (λa, λb, λc), said fiber Bragg gratings being obtained in one or more fiber-optic elements, wherein each of said one or more fiber-optic elements is incorporated in said portion of material of the body of the brake caliper, in a respective position and with a respective predefined and fixed spatial development;
and wherein the method further comprises:
transmitting, by the optical reading/interrogation unit, through the first input connection optical fiber, respective optical activation radiations to the plurality of sensor and/or strain elements, at different respective operating wavelengths (λa, λb, λc), by wavelength-division multiplexing (WDM) transmission techniques;
receiving, through the second output connection optical fiber, and distinguishing respective optical spectra reflected by each sensor of the plurality of deformation and/or strain sensors, by de-multiplexing with wavelength-division multiplexing (WDM) techniques, wherein each of said reflected optical spectra corresponds to a respective first photonic signal;
the step of generating, by the optical reading/interrogation unit, at least one first electrical signal comprising generating a respective plurality of first electrical signals, on the basis of said plurality of first photonic signals received;
the processing step comprising processing said plurality of first electrical signals to obtain a measurement of the braking force and/or braking torque.

8. The method of claim 7, comprising, before the processing step, a step of transmitting to a control unit said at least one first electrical signal and/or second electrical signal;
and wherein the processing step comprises:
calculating the braking force and/or braking torque, by a processor of the control unit using one or more algorithms run by one or more software programs, on the basis of said at least one first electrical signal or on the basis of said at least one first electrical signal and said second electrical signal, or on the basis of said plurality of said first electrical signals and said at least one second electrical signal,
wherein the calculating step comprises calculating the clamping force and/or braking torque by predefined non-linear relationships between the braking force and/or braking torque and the deformation and/or strain detected by the at least one deformation and/or strain sensor in the respective position in which it is incorporated in the brake caliper,
said predetermined non-linear relationships being represented by computerized models or look-up tables stored so as to be accessible by said processor of the control unit,
said predetermined non-linear relationships being determined by experiments and/or characterization and/or calibration performed after at least one deformation and/or strain sensor was incorporated in the brake caliper, and before using the brake caliper.

9. The method of claim 1, wherein said at least one fiber-optic strain sensor is connected to the optical reading/interrogation unit by a first connection optical fiber,
wherein the optical reading/interrogation unit is configured to activate said at least one fiber-optic strain sensor by transmitting an optical activation radiation through said first connection optical fiber, and
wherein said first photonic signal comprises a first optical spectrum reflected by the at least one deformation and/or strain sensor of fiber Bragg grating type, which reaches the optical reading/interrogation unit through said first connection optical fiber.

10. The method of claim 1, wherein the incorporating step comprises:
incorporating the at least one deformation and/or strain sensor within a pre-formed frame having predefined geometry and dimensions;
incorporating in the body of the brake caliper said pre-formed frame, during manufacturing of the brake caliper, in a fixed and predefined position, in a mold and/or molding enclosure of the brake caliper, so said at least one deformation and/or strain sensor is partially or completely incorporated in a desired portion of material of the body of the brake caliper,
or
wherein the step of incorporating at least one deformation and/or strain sensor in the body of the brake caliper comprises welding an optical fiber, in which said at least one deformation and/or strain sensor is obtained at a predefined portion of a surface of the caliper body,
wherein said welding step is performed by Ultrasonic Additive Manufacturing (UAM) technology, adapted to incorporate sensors into a metal body of the brake caliper by metal layers, or by means of laser technologies, adapted to direct weld the fiber into a clamp body.

11. The method of claim 1, wherein said receiving and generating steps are performed by a single optical reading/interrogation unit integrated and/or housed in the brake caliper.

12. The method of claim 1, wherein the steps of the method are performed by a plurality of brake calipers of disc brake calipers of a braking system of a vehicle,
and wherein said receiving and generating steps are performed by a single optical reading/interrogation unit, operationally connected to all disc brake calipers of said plurality of disc brake calipers of a braking system of a vehicle, or wherein said receiving and generating steps are performed by a plurality of optical reading/interrogation units, each operationally connected to one or more disc brake calipers of said plurality of disc brake calipers of a braking system of a vehicle.

13. The method of claim 1, wherein the processing step comprises obtaining a dynamic measurement of a trend in real-time of the braking force and/or torque, on the basis of time evolution of the detected deformation and/or strain.

14. A system for detecting and measuring a braking force and/or a braking torque deriving from actuation of a braking system for a vehicle, by detection performed in at least one brake caliper of the braking system, comprising:

at least one sensorized caliper, comprising:

a brake caliper comprising a brake caliper body made of a material susceptible to deformation due to a reaction force applied to the brake caliper at the braking force and/or braking torque, upon a braking event, in such a way that the body of the brake caliper comprises a portion of said material the deformation and/or strain of which is locally representative of the braking force and/or braking torque applied onto the braking system;

at least one deformation and/or strain sensor, incorporated in said portion of material susceptible of deflection, at a respective defined and fixed position, wherein said at least one deformation and/or strain sensor is a fiber-optic strain sensor of fiber Bragg grating type, configured to detect the deformation and/or strain acting locally in the respective defined and fixed position, and to generate at least one respective first photonic signal representative of detected deformation and/or strain;

first photonic connection means, connected to said fiber-optic strain sensor, and adapted to be connected to an optical reading/interrogation unit to transmit said at least one first photonic signal, wherein the optical reading/interrogation unit is further connected to a second photonic connection means and is configured to activate a fiber-optic temperature sensor transmitting a second optical activation radiation, and to receive at least one second photonic signal, wherein the system further comprises:

the optical reading/interrogation unit, optically connected to the first photonic connection means of the sensorized caliper to receive said at least one first photonic signal, said optical reading/interrogation unit being further configured to generate at least one second electrical signal representative of a detected temperature, on the basis of said at least one second photonic signal received, a remote control unit, external to the sensorized caliper, connected to said optical reading/interrogation unit to receive at least one first electrical signal, said remote control unit being configured to process said at least one first electrical signal representative of the deformation and/or strain to obtain and provide a measurement of the braking force and/or braking torque.

15. The system of claim 14, wherein:

the at least one sensorized caliper comprises:

at least one temperature sensor, incorporated in said portion of material of the body of the brake caliper which is susceptible to deformation, near the fiber-optic strain sensor, at a respective predefined and fixed position, wherein the at least one temperature sensor is a fiber-optic strain sensor of the fiber Bragg grating type, configured to detect a temperature value in the respective position, and to generate the at least one second photonic signal representative of the detected temperature;

second photonic connection means, connected to said fiber-optic temperature sensor, and adapted to be connected to the optical reading/interrogation unit to transmit said at least on second photonic signal;

and wherein the optical reading/interrogation unit is further connected to said second photonic connection means of the sensorized caliper to receive said at least one second photonic signal, said optical reading/interrogation unit being further configured to generate at least one second electrical signal representative of the detected deformation and/or strain, on the basis of said at least one second photonic signal received, and to transmit said at least one second electric signal to the remote control unit;

and wherein the remote control unit is further configured to process also said at least one second electrical signal to obtain a measurement of the braking force and/or braking torque, on the basis of said at least one first electrical signal and of said at least one second electrical signal.

16. The system of claim 14, wherein the optical reading/interrogation unit is integrated and/or housed in the sensorized caliper, and/or wherein the optical reading/interrogation unit is further configured to activate each of said strain and/or temperature sensors of optic fiber Bragg type, comprised in the sensorized caliper, whereby transmitting a first optical activation radiation and/or a second optical activation radiation, and/or wherein the optical reading/interrogation unit is further configured to transmit respective optical activation radiations to the at least one deformation and/or strain sensors, at the respective operating wavelengths ($\lambda a$, $\lambda b$, $\lambda c$), by means of wavelength-division multiplexing (WDM) transmission techniques, and to receive and distinguish the respective optical spectra reflected by each of said plurality of deformation and/or strain sensors, by de-multiplexing with wavelength-division multiplexing (WDM) techniques.

17. The system of according to claim 14, wherein the optical reading/interrogation unit comprises:

a broadband optical radiation source, configured to transmit said at least one first optical activation radiation and/or second optical activation radiation;

an opto-electronic spectrometer receiver, configured to select the wavelength and/or plurality of wavelengths to be received, and further configured to receive each of these at least one first photonic signal and convert it into said at least one first electrical signal; and/or to receive said second photonic signal and to convert it into said second electrical signal;

or wherein the reading/interrogation unit comprises:

a tunable optical radiation source, configured to transmit said at least one first optical activation radiation and/or second optical activation radiation, each radiation being at the desired respective wavelength;

a photo-diode opto-electronic receiver, configured to receive said first photonic signal and convert it into said first electrical signal; and to receive said second photonic signal and convert it into said second electrical signal;

or wherein the optical reading/interrogation unit is entirely made by a single integrated circuit implemented by photonic integrated circuit (PIC) technology, and wherein said single integrated circuit comprises:

a broadband optical radiation source, configured to transmit said at least one first optical activation radiation and/or second optical activation radiation;

at least one wavelength optical filtering element, which can be tuned in the surround of the wavelength of the queried fiber Bragg grating, to select a respective photonic signal;

a photo-diode opto-electronic receiver, configured to receive the selected photonic signal from said at least one first photonic signal and convert it to said first electrical signal; and/or to receive said second photonic signal, if selected, and to convert it into said second electrical signal.

18. The system of claim 14, comprising a plurality of sensorized calipers, belonging to the braking system of the vehicle, and comprising a single optical reading/interrogation unit operationally connected to each sensorized caliper of said plurality of sensorized calipers, or comprising a plurality of optical reading/interrogation units, each operationally connected to one or more brake calipers of said plurality of disc brake calipers of a braking system of a vehicle.

* * * * *